(12) United States Patent
Butehorn et al.

(10) Patent No.: US 7,388,869 B2
(45) Date of Patent: Jun. 17, 2008

(54) SYSTEM AND METHOD FOR ROUTING AMONG PRIVATE ADDRESSING DOMAINS

(75) Inventors: Matthew Butehorn, Mt. Airy, MD (US); John Border, Poolesville, MD (US); Patrick Stevens, Eldersburg, MD (US); Robert Torres, New Market, MD (US); Dennis Conti, Annapolis, MD (US); Vaibhav Kumar, Germantown, MD (US); Deepak Aryee, McLean, VA (US); Mangala Kannan, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 885 days.

(21) Appl. No.: 10/715,178

(22) Filed: Nov. 17, 2003

(65) Prior Publication Data

US 2004/0132451 A1 Jul. 8, 2004

Related U.S. Application Data

(60) Provisional application No. 60/427,511, filed on Nov. 19, 2002.

(51) Int. Cl.
*H04L 12/28* (2006.01)
*G01R 31/08* (2006.01)

(52) U.S. Cl. ............... 370/401; 370/392; 370/316; 370/230; 370/356

(58) Field of Classification Search ............... None
See application file for complete search history.

(56) References Cited

U.S. PATENT DOCUMENTS

| | | | |
|---|---|---|---|
| 5,740,164 A * | 4/1998 | Liron | 370/316 |
| 6,604,146 B1 * | 8/2003 | Rempe et al. | 709/238 |
| 2001/0036161 A1 * | 11/2001 | Eidenschink et al. | 370/316 |
| 2002/0051449 A1 | 5/2002 | Iwata | |
| 2003/0112809 A1 * | 6/2003 | Bharali et al. | 370/400 |
| 2004/0073678 A1 * | 4/2004 | Border et al. | 709/227 |

FOREIGN PATENT DOCUMENTS

WO  WO 00/77656  12/2000

* cited by examiner

*Primary Examiner*—Duc C Ho
(74) *Attorney, Agent, or Firm*—Bell, Boyd & Lloyd LLP

(57) ABSTRACT

An approach for routing over a radio network is provided. A terminal receives a packet over the radio network, which supports meshed connectivity, wherein the packet is destined for a destination host. The terminal determines whether the destination host is reachable by a communication interface based upon a route table, and selectively redirects the packet over the radio network according to the route table. A route server is provided to collect routes from the terminal as well as other terminals within the radio network. The route server then disseminates the collect routes to the terminals for updating of their respective route tables. The present invention has particular applicability to a fully meshed satellite network.

47 Claims, 15 Drawing Sheets

FIG. 7A

| Ver. No. | Message Type | Route Table Vers. | Table Broadcast Seq. No. | No. of Route Table Entries (M) | N* Route Table Entries |
|---|---|---|---|---|---|
| 701 | 703 | 705 | 707 | 709 | 711 |

| Network Address | Network Mask | Satellite Context ID (SCID) | Next Hop Network address (IPv4 or IPv6) | Cost Metric |
|---|---|---|---|---|
| 713 | 715 | 717 | 719 | 721 |

SYSTEM AND METHOD FOR ROUTING AMONG PRIVATE ADDRESSING DOMAINS

RELATED APPLICATIONS

This application is related to, and claims the benefit of the earlier filing date under 35 U.S.C. § 119(e) of, U.S. Provisional Patent Application Ser. No. 60/427,511, filed Nov. 19, 2002, titled "Method for Providing Need-Driven Real-Time Route Information in a Mesh Satellite Network"; the entirety of which is incorporated herein by reference.

FIELD OF THE INVENTION

The present invention relates generally to a broadband communications system, and is more particularly related to network routing.

BACKGROUND OF THE INVENTION

The maturity of electronic commerce and acceptance of the Internet as a daily tool by a continually growing user base intensify the need for communication engineers to design for scalability. The robustness of the global Internet stems in part from the routing protocols supporting such communication. The global Internet comprises largely a network of routers to direct network traffic. Improper routing results in packet loss and retransmissions. Namely, in a terrestrial setting, retransmissions do not impose a great cost in bandwidth, in view of the abundance of capacity afforded by advances in fiber optics and networking equipment. Bandwidth constraints are further heightened by the overhead cost of traditional routing protocols. As essentially a terrestrial system, the Internet can operate satisfactorily despite the inefficiencies of such routing protocols. By contrast, a satellite environment possesses unique characteristics compared to that of terrestrial systems, particularly with respect to bandwidth, latency, and network architecture. That is, in a satellite environment, capacity is relatively more precious such that protocol efficiency is a premium. Not surprisingly, bandwidth costs are significantly higher in a satellite network over a terrestrial system. In addition, the satellite network is burdened by inherent latencies stemming, for example, from propagation delay.

Architecturally, satellite systems exhibit interesting properties. These communication systems largely operate over the air according to a hub and spoke arrangement. Consequently, Architecturally, satellite systems exhibit interesting properties. These communication systems largely operate over the air according to a hub and spoke arrangement. Consequently, many "neighboring" routing nodes potentially exist on the air side. Additionally, the connectivity over the air is relatively stable; i.e., there are few redundant routes, as most sites are expected to be stub sites.

Furthermore, new Internet applications follow a peer to peer computing model. Accordingly, an examination of the architecture of traditional satellite systems is required to support these peer to peer applications. The traditional hub and spoke approach would entail greater delay for such applications.

Based on the foregoing, there is a clear need for improved approaches for providing efficient routing over a relatively high latency network. There is also a need to routing support over an architecture that can accommodate emerging peer to peer applications.

SUMMARY OF THE INVENTION

These and other needs are addressed by the present invention, in which a radio network, such as a satellite network, provides mesh connectivity for terminals. Each of the terminals is capable of redirecting traffic to the appropriate terminal if the data received can reach its destination via the particular terminal based on a local route table. A central route server is employed within the radio network to collect all route information for a specified private network and to coordinate the distribution of such information to the participating terminals. This approach advantageously reduces overhead in the distribution of routing information over a meshed satellite network.

According to one aspect of the present invention, a communication apparatus for routing over a radio network is disclosed. The apparatus includes an air interface configured to receive a packet over the radio network. The packet is destined for a destination host, and the radio network supports meshed connectivity. The apparatus also includes a communication interface coupled to the air interface. Further, the apparatus includes logic for determining whether the destination host is reachable by the communication interface based upon a route table. If the destination host is determined not to be reachable, the logic redirects the packet over the radio network according to the route table.

According to another aspect of the present invention, a communication apparatus for routing over a radio network is disclosed. The apparatus includes a first interface means for receiving a packet over the radio network. The packet is destined for a destination host, and the radio network supports meshed connectivity. The apparatus also includes a second interface means coupled to the first interface means. Further, the apparatus includes means for determining whether the destination host is reachable by the second interface means based upon a route table; and means for redirecting the packet over the radio network according to the route table if the destination host is determined not to be reachable.

According to another aspect of the present invention, a method for routing over a radio network is disclosed. The method includes receiving a packet over the radio network. The packet is destined for a destination host, and the radio network supports meshed connectivity. The method also includes determining whether the destination host is reachable by a communication interface based upon a route table, and selectively redirecting the packet over the radio network according to the route table.

According to another aspect of the present invention, a method of supporting intra-domain routing includes receiving, at a route server, routing information from one of a plurality of route clients. The route clients are in communication with the route server over a first data network that is fully meshed, wherein the routing information specifies reachability of a host that is within a second data network served by the one route client. The method also includes modifying a route table of the route server in response to the received routing information. The method further includes transmitting a message based on the modified route table to the route clients for updating of respective route tables of the route clients.

According to another aspect of the present invention, a method of supporting intra-domain routing over a satellite network is disclosed. The method includes determining routes reachable over a terrestrial interface. The method also includes transmitting routing information associated with the reachable routes over a satellite interface communicating with the satellite network to a route server, wherein the route server modifies a database storing routes reachable over the satellite network based on the routing information. The satellite network is fully meshed. The method further includes selectively receiving routes reachable via the satellite interface from the route server.

According to another aspect of the present invention, a server apparatus for supporting intra-domain routing includes an air interface configured to communicate with a radio network supporting communication among a plurality of terminals according to a meshed topology. Each of the terminals is configured as a route client. The air interface receives routing information from one of the terminals, wherein the routing information specifies reachability of a host that is within a data network served by the one terminal. The apparatus also includes memory configured to store a route table that is modified based on the received routing information. A message is transmitted via the air interface to the terminals based on the modified route table for updating of respective route tables of the terminals.

According to yet another aspect of the present invention, a terminal apparatus for supporting routing over a satellite network is disclosed. The apparatus includes a terrestrial interface configured to communicate with a plurality of network elements. The apparatus also includes a processor configured to determine routes reachable to the plurality of network elements. Further, the apparatus includes a satellite interface configured to transmit routing information associated with the reachable routes to a route server within the satellite network having a meshed configuration, wherein the route server modifies a database storing routes reachable over the satellite network based on the routing information, and routes reachable via the satellite interface are selectively received from the route server.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 7a and 7b are diagrams of a Route Table Broadcast message and a format of a Route Table entry, respectively, used in an Internal Satellite Routing Protocol, in accordance with an embodiment of the present invention;

DESCRIPTION OF THE PREFERRED EMBODIMENT

A system, method, and software for supporting intra-domain routing in a meshed network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite network, it is recognized by one of ordinary skill in the art that the present invention has general applicability to data networks with meshed topologies.

Figure 1:
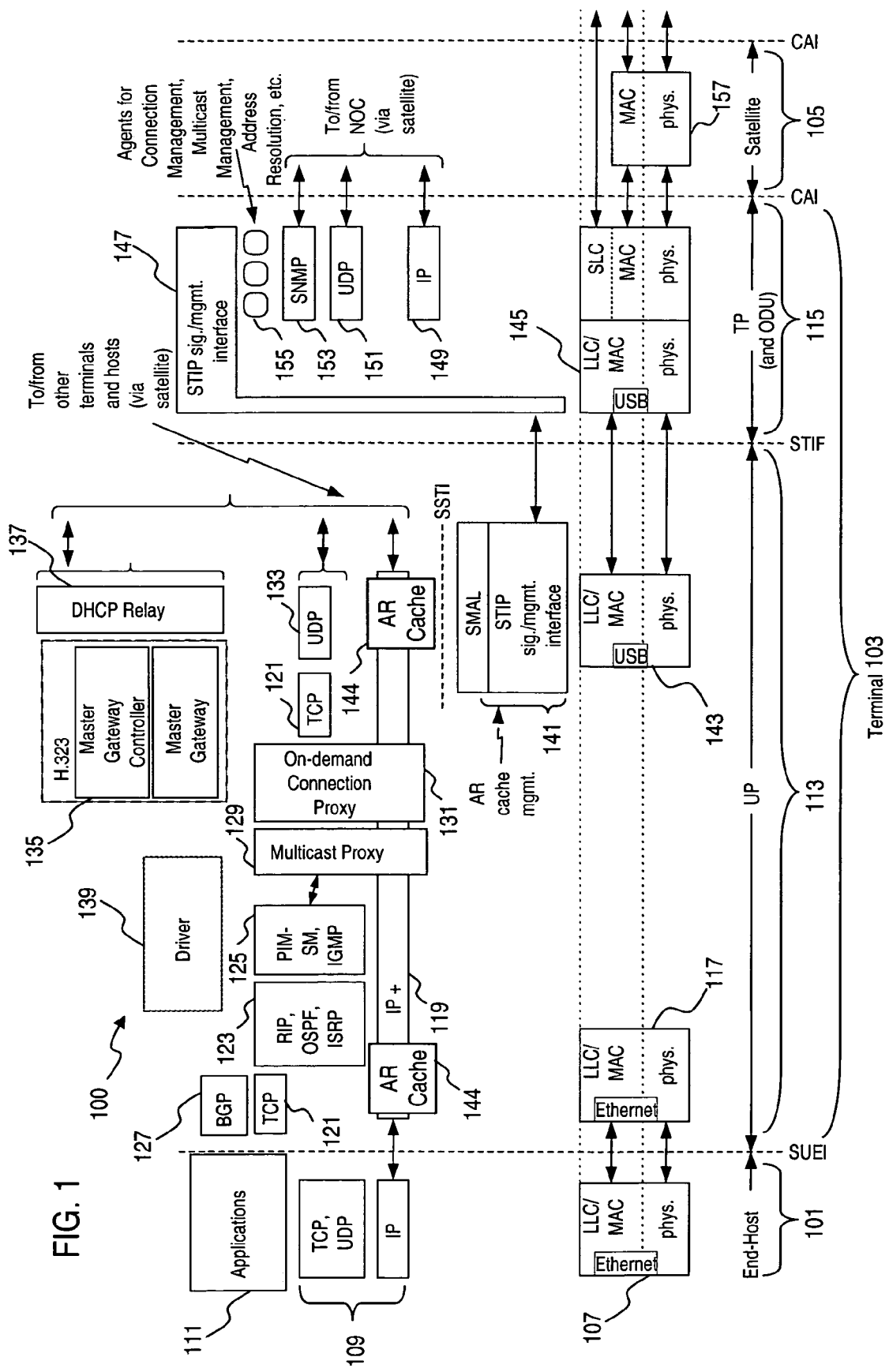
FIG. 1 is a diagram of a signaling and management protocol architecture of a satellite terminal (ST), according to an embodiment of the present invention.

FIG. 1 is a diagram of a signaling and management protocol architecture of a satellite terminal (ST), according to an embodiment of the present invention. As shown, a communications system 100 permits an end-host 101 to interface with a satellite terminal 103 to exchange information over a satellite 105 with other end-hosts (not shown). The satellite 105 communicates with a Network Operations Center (NOC) (not shown), which provides various management functions (e.g., management of network faults, configuration, accounting, performance, and security) of the system 100.

In an exemplary embodiment, the ST 103 is a Very Small Aperture Terminal (VSAT) to which the end-host 101 is attached. Under this architecture, users can communicate from one VSAT ST directly to another in a single satellite hop. The satellite 105 contains a fast packet switch (FPS) (not shown) to process data packets that are exchanged across the system 100. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 105 receives on the uplinks to the proper downlinks. The payloads of satellite 105 may include other components, such as uplink antenna, down-converters, switch matrix, demodulator banks, and phased-array downlink antenna; these other components are well known, and thus, are not described in detail.

The end-host 101 includes, in an exemplary embodiment, a network interface 107 (e.g., Ethernet), a Transmission Control Protocol/Internet Protocol (TCP/IP) stack 109, and an Applications layer 111. In lieu of TCP, the end-host may utilize the User Datagram Protocol (UDP).

According to an embodiment of the present invention, the terminal 103 may be functionally partitioned into a User Platform (UP) 113 and a Transmission Platform (TP) 115. The UP 113 is responsible for interfacing with the end-user networks. As such, the UP 113 includes a network interface 117 (e.g., Ethernet), an IP layer 119, and a TCP layer 121. UDP 133 can also be supported. The UP 113 also supports a number of routing protocols 123, such as the Routing Information Protocol (RIP), and Open Shortest Path First (OSPF). Additionally, the present invention provides an Internal Satellite Routing Protocol (ISRP) to handle routing over a radio communication system, such as a satellite network. With ISRP, the system 100 has the capability at the air interface to allow STs to exchange routing information about the IP networks that can be reached through them, including IP network addresses and distance metrics.

The Internal satellite Routing Protocol (ISRP) refers to a family of sub-protocols, each of which is involved with supporting IP routing over the air. According to an embodiment of the present invention, these sub-protocols, which are more fully described below with respect to FIG. 2, include an ISRP Core Routing protocol, an ISRP Redirect Routing protocol, and an ISRP Address Lease protocol. This suite of protocols is more fully described later.

In an exemplary embodiment, the ISRP messages are carried over UDP/IP, and are sent using a reserved UDP port as the destination port number in the UDP header. This UDP port number is denoted as the "ISRP port." The IP layer 119 runs the ISRP Core Routing protocol, which is a dynamic routing protocol on the air interface. A set of ST ports, which constitute members of an "ISRP Routing Domain," participate in this protocol to learn routes reachable through each other.

As a distance vector protocol, RIP determines a route based on the smallest hop count between source and destination. The Open Shortest Path First routing protocol is a link state protocol and serves as an interior gateway protocol (IGP). These dynamic routing protocols 123 operate over IP;

RIP and OSPF are terminated at the terrestrial interface, while the ISRP is terminated at the satellite interface.

Additionally, a variety of multicast protocols 125 are supported, including Internet Group Management Protocol (IGMP) and Protocol-Independent Multicast—Sparse Mode (PIM-SM). These protocols 125 operate with a multicast proxy 129 to provide multicasting functionality.

The UP 113 is also loaded with appropriate software drivers 139 to permit exchange of information over the satellite network. To interface to the TP 115, the UP 113 possesses a Signaling and Management Adaptation Layer (SMAL)/System Transmission Information Packets (STIP) interface 141, and a data interface (e.g., Universal Serial Bus (USB)) 143 with Logical Link Control/Medium Access Control (LLC/MAC) and Physical Layer (PHY) functionalities. Within the UP 113 is a System Transport Interface (SSTI), which is used to separate the IP Adaptation functions from the satellite network specific functions of the ST. The SSTI is used in the inter-working mechanisms of IP over the satellite network. An IP (e.g., IPv4 or IPv6) network address is assigned to the IP interface of the SSTI, while a satellite network MAC address is assigned to the SMAL interface 141 of the SSTI. Resolution between these two addresses is performed when other STs intend to send IP packets across the satellite link to this ST as the next hop IP router.

An additional network address (IPv4 or IPv6) is assigned to the IP interface to Ethernet. The Ethernet portion of the UP 113 contains an Ethernet link address that was determined when the UP 113 was manufactured. Resolution between these two addresses is performed when hosts and routers on the STs terrestrial interface intend to send IP packets to the ST as the next hop IP router.

IP datagrams may enter the ST 113 terrestrially or by a satellite link. The present invention, according to one embodiment, describes the determination of the IP address of a "next hop" router and its MAC layer address in order to forward the IP datagrams.

The system 100 permits nodes from separate private networks to communicate through the use of translation mechanisms. Specifically, the system 100 utilizes network address translation (NAT) and application layer gateways (ALGs), routing and address resolution are de-coupled. Address resolution is the means by which a network layer (IPv4 or IPv6) address is resolved to a link layer address.

To better appreciate the present invention, by way of example, the processing of a received packet is as follows. A network device capable of performing routing functionalities (e.g., a router, a satellite terminal (ST), etc.) examines the destination IP address of a received packet to determine if it is the destination. If in fact the network device is the destination device, the network device passes the IP packet "up the stack" to the appropriate application based on the protocol field. If not, the network device decrements a Time to Live (TTL) counter (or Hop Count), discarding the packet if this value equals zero. The network device then examines the destination IP address to determine if the destination host belongs to the subnets associated with any of the network device's interfaces. If so, the network device performs address resolution of the destination host IP address as described in the step below. If not, the network device determines the "next hop" IP address from the route table, and address resolution of the next hop (or destination host) IP address is performed.

Address resolution determines the MAC layer address associated with the next hop IP address (e.g., an Ethernet MAC address). The IP datagram is encapsulated with a MAC layer header, and the packet is passed "down the stack" to the router interface as determined by the route table.

The TP 115 interfaces with the ST's satellite over an air interface. Accordingly, the TP 115 includes a data interface (e.g., Universal Serial Bus (USB)) 145 that communicates with the data interface 143 of the UP 113. The TP 115 has a STIP Signaling/Management interface 147, which interacts with the SMAL/STIP interface 141. In addition, the TP 115 includes an IP layer 149, a UDP layer 151, a SNMP module 153, and agents 155 for connection management, multicast management, address resolution, etc.

The satellite 105 supports an access layer 157 to communicate with the corresponding interface 145 of the TP 115. The system 100 supports mesh point-to-point communications, enabling the exchange of packets among STs via a single hop.

At times, the terminal 103 may be inactive; e.g., a customer turns the terminal off, equipment malfunction, power failure, etc. When service for an inactive ST is resumed, the terminal 103 is able to signal to a customer premises equipment (CPE), which in this example, is the end-host 101, that routes over the satellite network are reachable.

The ST 103 possesses the ability to resolve IP addresses to destination ST addresses using, in an exemplary embodiment, local table lookups to the ST 103 or using queries to the NOC. That is, the system 100 supports Address Resolution queries between the terminal 103 and the NOC. According to one embodiment of the present invention, an AR cache 144 is provided for each interface; alternatively, a single AR cache can be used. Address resolution is performed after the router interface is determined and makes use of an AR cache 144, which keeps AR entries for resolving the network address. The AR cache 144 is populated by a network protocol associated with the router interface. In addition, static AR entries can also be configured. The exact format of the cache entries depends on the particular implementation; however, a common data structure exists for all AR caches 144. Each entry contains a network address (IPv4 or IPv6), the link layer address, and a timeout value. A customer may specify the cache timeout value via configuration. AR entries may be removed from the cache when the timeout value has elapsed.

With respect to customer networks that are supported by the system 100, the ST 103 has two link layer interfaces: a satellite network interface and a network interface (e.g., Ethernet). For the Ethernet interface, the ST, in an exemplary embodiment, utilizes ARP (Address Resolution Protocol), according to Internet Engineering Task Force (IETF) RFC 826, for resolving IPv4 addresses and Neighbor Discovery (ND), according to IETF RFC 2461, for resolving IPv6 addresses. Both IETF RFCs 826 and 2461 are incorporated herein by reference in their entireties. The ST 103 supports an AR cache 144 for each of its Ethernet interfaces. The size of this cache is dependent on the number of hosts/routers that are connected to the LAN segment.

The AR cache 144 supporting IPv6 and the Ethernet link may contain only a portion of the IPv6 address. If the Site Local Address identifier (SLA ID)—for Global Unicast addresses—or the Subnet ID are mapped uniquely to an Ethernet interface, then the AR cache 144 entry may use the 64-bit Interface ID or Station ID to identify the network address to be resolved.

Because the satellite network is a shared resource in which many subnets all use a single communication link, next-hop IP addresses assigned by the customers are not guaranteed to be unique. However, uniqueness is required in order to resolve to the Satellite MAC address. This approach utilizes a "Satellite Context Identifier" (SCID) (which uniquely identifies the customer for a region). This identifier may be used in addition to the next-hop IP address to perform address resolution for the satellite interface.

As shown in Table 1, an exemplary data structure of the AR cache 144 for the satellite link includes the SCID, the next-hop IP address, and a 32-bit unicast Satellite MAC address as shown in Table 2 (below), and an AR pass/fail indicator. The SCID is part of the Route Table entry and is used by the ST 103 when performing address resolution on the satellite interface.

TABLE 1

| Satellite Context ID (SCID) | Next Hop IP Address | Satellite MAC Address | AR Pass/Fail |
|---|---|---|---|
| 16 bits | 32 bits | 32 bits | 1 bit |

TABLE 2

| 21 bits | 11 bits |
|---|---|
| Destination Sub-address | Destination Information |

AR cache entries for the satellite link are configured by a user (or customer) or learned by the ST 103 using the Satellite ARP. Configured cache entries can have a predefined value for the cache timeout, which signifies that the entry is not to be timed out. One use of static cache entries, for example, is for the case when the ST is configured with a default route pointing to its access gateway. In such a case, a static AR entry is so configured to resolve the network address of the access gateway to match the default route. The NOC can validate the configured static AR entries to conform, for instance, to community of interest (COI) restrictions.

If an ST 103 is configured with a satellite ARP, and an entry is not found in the AR cache 144 associated with the STs satellite interface, then the ST 103 participates in the Satellite ARP protocol to resolve the network address to the satellite MAC address. Entries learned by way of Satellite ARP are inserted into the AR cache 144 along with the pre-configured cache timeout value.

There are conditions when the NOC is configured with MAC addresses for the same network address. In such a case, the network addresses associated with the same Satellite MAC address need not be part of the same COI. This characteristic allows the NOC to resolve the network address to the Satellite MAC address by making use of the SCID of the AR request.

The ST's Transport Platform (TP) and the NOC participate in the Satellite ARP protocol. The NOC provides an address server, which contains a database of all the Satellite MAC addresses assigned to all customer networks supported by Satellite for each satellite in a given region. The Satellite MAC address is unique to a specified satellite link. Associated with the Satellite MAC address is a network layer (IPv4 or IPv6) address and a Satellite Context ID (SCID). The network layer address is unique within the customer network, but not necessarily unique within the satellite link.

The notion is that the ST 103 can query the address server for the address resolution information to forward a packet. After validating the query, the address server returns an entry for the address resolution information. The ST 103 inserts this entry into the AR cache 144 associated with the satellite interface and uses it to forward the packet to another ST across the satellite link. The IP packet that triggered the Satellite ARP request (and subsequent IP packets to the same subnet) is queued. In an exemplary embodiment, the NOC responds to an address resolution query within a predetermined time period (e.g., 2 seconds) over the space link. The two messages necessary for this mechanism are Satellite ARP Request and Satellite ARP Response.

According to one embodiment of the present invention, the Satellite ARP Request has the following format: Satellite ARP Version Number, Satellite ARP Message Type (Satellite ARP Request), Network Type (IPv4 or IPv6), Network layer (either IPv6 or IPv4) address to be resolved, and Satellite Context ID (SCID). Further, a Satellite ARP response may have the format: Satellite ARP Version Number, Satellite ARP Message Type (Satellite ARP Response), Network Type (IPv4 or IPv6), Network layer (either IPv6 or IPv4) address to be resolved, Satellite Context ID (SCID), Satellite MAC address, and Satellite ARP Response Status.

When the NOC receives a Satellite ARP request, the NOC identifies those COIs of which the particular ST 103 is a member and searches the corresponding AR tables. The NOC uses the SCID and the "next hop" network address within the appropriate COIs to search for the Satellite MAC Address. The NOC returns the matching AR entry in the Satellite ARP response message. These tables may be populated as part of a customer configuration process of an ST 103. A Satellite ARP response status is returned for error conditions or when COI restrictions prevent communication.

When the ST 103 receives the Satellite ARP Response message, the ST 103 caches the entry, sets a timer, and uses the information in the Satellite ARP Response message to form the satellite packet. The entry is cached regardless of the value of the Satellite ARP Response Status. If the Satellite ARP Response gave a "fail" indication, then subsequent AR requests following a route lookup will avert the sending of Satellite ARP Requests that would be denied. As with successful ARP Responses, unsuccessful ARP Responses cache entries would be timed out.

As stated, the above address resolution process is decoupled from routing, which is described below in FIG. 2.

Figure 2:
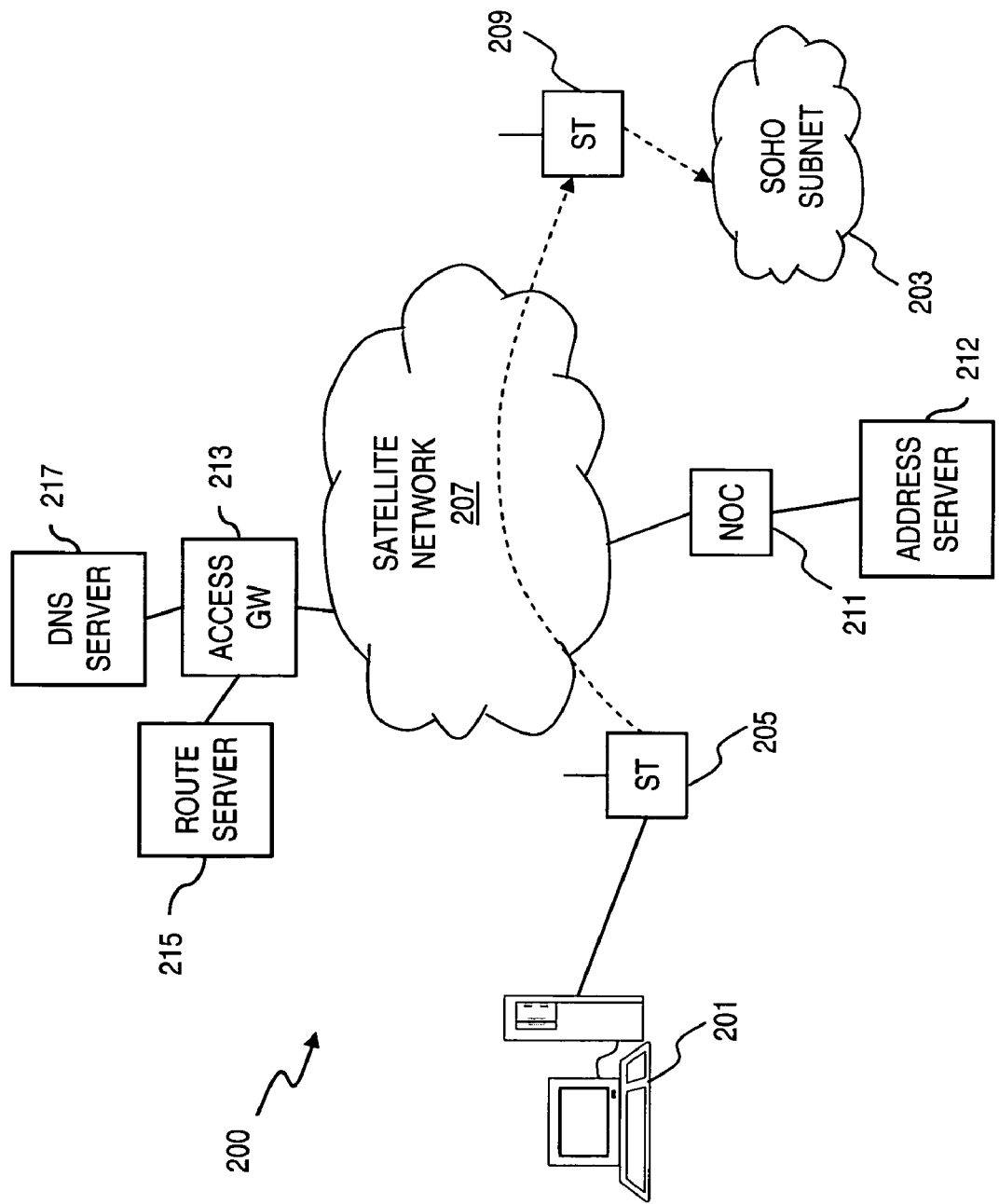
FIG. 2 is a diagram of a satellite system utilizing static or dynamic routes to establish communication among satellite terminals, according to an embodiment of the present invention.

FIG. 2 is a diagram of a satellite system utilizing static or dynamic routes to establish communication among satellite terminals, according to an embodiment of the present invention. For the purposes of explanation, a communications system 200 is described with respect to IP packets originating from an end-host 201 to a Small Office/Home Office (SOHO) network 203 using static or dynamic (via ISRP) routes. The end-host 201 couples to a satellite terminal 205, which provides access to a satellite network 207. The SOHO subnet 203 receives the IP packets via ST 209.

By way of example, the route table of the ST 209 supporting the SOHO subnet 203 contains static route(s) pointing to the elements of the SOHO subnet 203. A NOC 211 provides the customer with the capability to configure the static route entry. As mentioned previously, the NOC 211 can include an address server 212. When the ST 209 receives an IP packet from a satellite link, the ST 209 performs a lookup to find a matching route entry that contains, in an exemplary embodiment, the destination IP subnet, a network mask, the next hop IP address, and a cost metric. The ST 209 then resolves the next hop IP address.

As seen in FIG. 2, a Domain Name System (DNS) server 217 is deployed behind the access gateway 213. As used herein, the term "DNS server" refers to a computing system that is configured to execute the name server processes, which is more fully described later.

Under this scenario, a telecommuter, for example, is connected to the office (which is served by the SOHO subnet 203) by the end-host 201. Assuming the telecommuter frequently interfaces with the SOHO subnet 203, the routing approach for the telecommuter ST 205 is likely static routing. In this case, the customer configures a static route into the ST supporting the telecommuter whose destination address matches the SOHO subnet 203 and whose next hop points contains the network address of the SOHO ST 209. The NOC 211 provides the customer with the capability to configure these static route entries.

In an exemplary embodiment, a static route entry includes the following fields: a destination IP subnet, a subnet mask, the Satellite Context ID (SCID), a next hop network address, and a cost metric. The static AR entry may be configured into the satellite interface of the telecommuter ST 205, which resolves the network address (using the SCID) of the static route.

In the above example, the end-host 201 designates the ST 205 as the default "router." When packets enter the terrestrial interface of the ST 205, the ST 205 performs a route table lookup. If the packet is destined for the SOHO network 203, then the static route configured by the NOC 211 is selected. The default route, as indicated, for example, by 0.0.0.0 in the IPv4 network address field of the route entry, specifies the next hop IP layer address when a match is not found in the route table for the IP datagram's destination address. Both default and static route table entries would include the next hop network address (IPv4 or IPv6) and the Satellite Context ID for the satellite interface.

The system 200 also supports dynamic exchange of routing information among STs as well as between STs and terrestrial routers through several routing mechanisms. These routing mechanisms can be classified into two categories. The first category relates to the link layer interface; i.e., terrestrial versus satellite. According to an exemplary embodiment, the routing mechanisms that are supported by the terrestrial interface of the ST 205 (e.g., Ethernet) may conform to IETF standard protocols. The routing mechanisms that support the satellite interface of the ST 205 may support IETF standard routing protocols or provider developed protocols.

The second category of routing mechanisms relate to STs (and other routers) that exchange routing information within a customer's network, and STs (and other routers) exchanging routing information between customer's networks. The protocols that exchange routing information within a "domain" or customer's network are referred to as interior routing protocols (IGPs), while protocols that exchange routing information between "domains" or customers' networks are referred to as exterior routing protocols (EGPs).

The STs 205, 209 support IP (e.g., version 4 and version 6) at their terrestrial interfaces. The STs 205, 209 that are configured to support IP may support, for example, RIPv1, RIPv2, or OSPFv2 for dynamic routing on their Ethernet interface. The STs 205, 209 that are configured to support IPv6 may support RIPng (RFC 2080) or OSPF for IPv6 (RFC 2740) for dynamic routing on their Ethernet interfaces. The NOC 211 provides the capability to configure the ST with RIPv1, RIPv2, and RIPng parameters to support dynamic routine on its Ethernet port, as well as the capability to configure the ST with OSPF parameters to support dynamic routing on its Ethernet port.

As mentioned previously, the ST 205, 209 can also employ an Internal Satellite Routing Protocol (ISRP), which is an IGP that sends dynamic routing information across the satellite interface. This routing mechanism, in an exemplary embodiment, utilizes an access gateway 213 in communication with a route server 215 that acts as a centralized point within a customer network for distributing routing information. As evident from the above discussion, ISRP operates with the Internet Protocol (IP) (e.g., IPv4 or IPv6), whereby each version of IP requires an assignment of a value to the protocol field of the IPv4 header or the next header field of the IPv6 header.

ISRP specifies the set of mechanisms that are used by the STs and the route server 215 at the access gateway 213 for providing dynamic routing information to customer STs. According to one embodiment of the present invention, the ISRP specifies the following elements: the ISRP messages used for dynamic routing, the behavior of the route server as it sends and receives these messages, the behavior of the ST as it sends and receives these messages, and the handling of cost metrics between terrestrial protocols and ISRP. Within the customer's network, the route server and its member STs exchange routing entries (which is more fully described below).

As discussed, an ST may be configured to run dynamic routing protocols (e.g., RIPv1, RIPv2, and OSPFv2) for their terrestrial networks. ISRP specifies the behavior of the ST in translating the terrestrial routing protocol information with internally represented routing information. Cost metrics are exchanged between terrestrial protocols and ISRP, particularly whenever route redistribution takes place in a router. Route redistribution is the process within a router whereby the ports of a router are executing more than one dynamic routing protocol. For example, the router may operate OSPF from some of its ports and RIP on the remaining ports. Cost metrics may measure multiple parameters. Metrics may measure throughput, delay, financial cost, and reliability or hop count. Exemplary metrics are detailed in "Routing in the Internet" by Christian Huitema ($2^{nd}$ edition), which is incorporated herein in its entirety.

Distance vector type routing protocols, such as RIP, use the cost metric for measuring the number of hops to the destination network. Link state protocols may use a linear combination of parameters to arrive at a cost metric. At issue within the satellite network is how cost metrics are converted between RIP and ISRP, between OSPF and ISRP, and how the STs route table are used to specify cost. Network service providers may assign an integer value to the cost of the satellite link.

One possibility is to assign a linear relationship between the cost metrics represented terrestrially and those represented over the satellite link. For example, if $C_t$ represents the cost as represented by RIP or OSPF, and $C_s$ represents the cost as represented by ISRP, then a linear relationship could be specified by the formulation: $C_s = a*C_t + b$. The NOC provides the mechanism for the customer to configure the values of a and b for the STs that perform the translation.

According to one embodiment of the present invention, ISRP operates according to a route server model, whereby the participating entities exchange distance vector information. The route server architecture contrasts with the concept of distributed dynamic routing protocols, where routing information is conveyed in the network in a distributed fashion. With the route server architecture, a central server 215 collects all route changes and coordinates the distribution of these changes to the participating routers. This approach advantageously results in less network bandwidth being used for overhead. These characteristics are well suited for a satellite network with mesh capability.

An ISRP routing domain is defined as a set of ISRP core routing entities, each entity running in either one of the two modes of ISRP core routing operation—either as an ISRP route server 215, or as an ISRP route client. Each ISRP routing domain includes an ISRP core routing entity operating as an ISRP route server. All other participant ISRP core routing entities run as ISRP route clients. The ISRP route clients are pre-configured with the address of the route server. It is noted that a single ST Port may have two ISRP core routing entities, one running as a route client and the other as a route server. The selection of the ST port to host the route server from among all ST ports constituting an ISRP routing domain, according to one embodiment of the present invention, can be entirely static, based on the configuration.

The ST runs, for example, an IGP (e.g., RIP) at its terrestrial ports. Routing information learned at the terrestrial interface is used to update the routing database at the ST. Any change in the routing information learned at the terrestrial ports can trigger appropriate route changes to be advertised at the air interface via the ISRP Core Routing protocol. Similarly, changes in the routing database induced by ISRP routing updates at the air interface trigger appropriate route information to be advertised at the terrestrial interface.

ISRP Redirect Routing provides another mechanism by which routing information may be disseminated over the air. This ISRP sub-protocol provides a means for an ST port to advertise, in a point-to-point fashion to another ST port the proper route (as present in its local route table) to use for a particular network. The triggers for the generation of this point-to-point route advertisement include the receipt of a misrouted packet at an ST port on its air interface. An entity involved in the generation and consumption of ISRP Redirect Routing messaging within an ST port is defined as an "ISRP Redirect client."

The ISRP Address Leasing sub-protocol is used for dynamic assignment of NAPT addresses for satellite NAT purposes. An "ISRP Address client" is the entity resident at an ST port that engages in ISRP Address Leasing signaling with an "ISRP Address Server." The Address Server uses a pool of configured addresses to assign temporary leases of addresses as and when requested by Address Clients. This protocol also defines signaling for requesting extensions of address leases.

The ISRP Core Routing protocol exchanges routing information via route entries, whereby each route entry advertises reachability for a particular network or host address, (represented as a network address and network mask pair) via a specific next-hop node (i.e., ST port). In addition, each advertised route entry contains a measure of the cost of the route. An ISRP route client advertises information about all routes reachable via the terrestrial interface of the ST port at which the route client resides. This information is required by all "peer" route clients to learn about the terrestrial connectivity at each of the peers.

Routing information is disseminated, in an exemplary embodiment, using unicast transmission of the routing information by each route client to the route server 215. The route server 215 can then multicast the information thus collected to all the route clients. Before multicasting the information, the ISRP server 215 can provide pre-processing of the collected routes. For example, pre-processing can be used to further reduce traffic by performing distance vector for the route clients, or to apply network wide routing policies. This mechanism of route distribution via a proxy vis-à-vis direct distribution conserves system bandwidth by not requiring each ST port to send point-to-point route updates to all peer ST ports in addition to not requiring them to know about all possible peers.

The operation of the ISRP Core Routing protocol is as follows. At initialization, ISRP route clients use the terrestrial reachability information compiled by a terrestrial protocol to specify their entire terrestrial connectivity to the well-known port at the (pre-configured) route server. The route server collects all the updates and multicasts them to all the route clients. Subsequent changes in terrestrial connectivity result in the route changes thereby induced, to be collected and conveyed to the route server 215 by the affected route client. The route server 215 multicasts these changes to all the route clients. The route clients also send periodic messages to the route server 215; the receipt of these messages at the route server 215 being an indication of presence of connectivity with these route clients. If these periodic messages are not received for a certain period of time, the connectivity with the associated route clients is assumed to be lost, and the route server 215 updates its database to reflect this loss of connectivity. This information is then multicast to all route clients.

The fact that route information advertised by the route clients can be a subset of the total applicable information-set in the current route table at the route client introduces the necessity of maintaining state about route table updates at the route clients and the route server 215. The route server 215 maintains a route database version number that specifies unambiguously the state of the route database. The route clients are expected to keep their local route table updated to the same version as of the central database. Version numbers are advertised in the messages that are exchanged between the route clients and the server, to keep each other appraised of the updates to the route information. If the server detects a route client as using an incorrect version number it takes suitable actions to update the route client with the route information that is required to bring the route client up to date. The protocol ensures that if a route client misses an update it subsequently learns the missed information to bring its route table in synchronicity with the central database.

Because the ISRP Core Routing protocol is a distance-vector protocol, issues of instability and convergence are of concern. The protocol can employ split horizon (without poisoned reverse) to address these concerns. An ISRP route client only advertises terrestrial routes (i.e., routes with the next-hop node reached over its own terrestrial interface) to the route server 215. This guards against the problem when an old incorrect route is advertised by a "non-authoritative" ST, thereby corrupting the route. In addition, a route client, on detecting the loss of connectivity to a network reached over its terrestrial interface, updates the cost of the route to infinity and advertises this updated route to the route server 215. It is noted that this is required to delete the routes, since routes (learned over the air interface through Core Routing) never time-out at the route clients.

As an additional safeguard against routing instability, the system can optionally implement "triggered updates" for deleted routes. Under this approach, the client, upon learning loss of connectivity to a network, will immediately send an update to the route server 215. The route server 215, on receiving an update from a route client advertising a deleted route; that is, a route with a cost of infinity immediately multicasts the update to the route clients to delete the invalid route as soon as possible from the route tables at the route clients.

As a distance vector protocol, the semantics the ISRP associates with the cost of a route is the number of hops required to reach the network indicated in the route, as that employed, for example, in RIPv2. In general, it may be necessary when importing routes learned via the terrestrial protocol into ISRP for advertisement over the air to derive suitable costs to advertise for those routes. This derivation is specific to the terrestrial protocol. Furthermore, an implementation may allow policy based cost-setting for ISRP advertisement. Similarly, cost of routes learned via ISRP are modified before importing them into the local route database.

The ISRP Core Routing protocol also includes an ISRP Bootstrapping protocol. The ISRP Bootstrapping protocol allows the facility for ISRP route clients to advertise their terrestrial routes to the route server 215 of their routing domain, without providing for the dynamic distribution of this collected route information by the route server 215 to its route clients. In conjunction with the ISRP Redirect Routing protocol, the Bootstrapping protocol enables "on-demand" dynamic routing. In a network where communication with most of the peer ST ports of the routing domain is infrequent, Bootstrapping (with Redirect Routing) avoids the overhead of distribution of collected routes by the route server 215, particularly if the network is highly dynamic.

ISRP Bootstrapping based routing operates as follows. The ISRP route clients in an ISRP routing domain advertise all terrestrial routes and route changes using signaling specified by the Core Routing protocol to the route server 215 of the domain. The network-wide route database built up in this manner by the route server 215 is propagated to the local route client, which assumes the role of the "hub" of the network, and where the route database is applied to the local route table. All other clients are configured with static route(s) such that all packets destined anywhere within the (intra-)network are directed to the hub. The hub then uses Redirect Routing to convey the appropriate routes at clients, if and when required.

The ISRP Redirect Routing protocol supports on-demand point-to-point route distribution. An ST port, on receiving an IP packet at the air interface that needs to be re-routed back on the air interface may use Redirect Routing signaling (the ISRP Satellite Redirect message) to implant the correct route at the ST port originating the packet. The ST port receiving the initial Satellite Redirect may then implant the reverse route (to itself) at the correct next-hop ST port, thereby establishing a complete two-way communication path.

Redirect Routing can be used for dynamic intra-network routing (i.e., routing within an ISRP routing domain), when ISRP Bootstrapping is used within the network. This redirect routing mechanism supports inter-Routing Domain routing (both within and across administrative boundaries) without requiring configuration of static routes at all ST ports. In this way it allows for semi-dynamic inter-Routing Domain routing. This routing is not fully dynamic since configuration of static routes is required at the hubs of the networks for Redirect based routing to work across routing domains. The redirect routing mechanism provides the advantages: further reduction in routing overhead (over the full core routing mechanism), particularly when the communication is predominately between a hub ST and the remote STs, and mesh (peer to peer) communication accounts for a relatively small amount of the total traffic; and supporting "thin" clients with reduced resources that translates to a smaller route table size (vis-à-vis the route server).

For communication across administrative boundaries (and frequently within a single administration across routing domains) IP address translation may be required. The ISRP Address Leasing protocol provides a mechanism to obtain on-demand the IP address to translate packets for such a communication. A managed network may define one or more ISRP Address Servers to assign NAPT addresses to Address Clients requesting these addresses. It is noted that one address client may only be served by one address server, but there could be multiple address servers serving distinct sets of clients within an administrative domain.

The advantage of having an address server 212 assigning NAPT addresses on-demand vis-à-vis assigning static NAPT addresses to ST ports is that a shared pool of addresses may be allocated to a network as a whole and statistical multiplexing gains can be extracted on the shared pool, thereby reducing the number of addresses that would have otherwise been required.

The Address Leasing protocol also provides a mechanism for the renewal of address leases. This ensures that uninterrupted communication is possible between ST ports for periods of time longer than the initial lease period.

Under certain circumstances, the address server 212 may experience loss of state due to a variety of reasons. To guard against the possibility of the same address being assigned to multiple ST ports at the same time, the protocol provides an asynchronous flush mechanism. This mechanism entails multicasting a message to all address clients served by the address server 212 to trigger the immediate expiry of any address leases assigned by the address server 212.

Of relevance to the subject of address translation over the satellite network is the concept of an Address Domain. An address domain can be understood to be a collection of ST-ST ports that use consistent (compatible) IP addressing such that no address translation is required over the satellite network for communication between them. Addresses assigned by the Address Server are associated with specific destination address domains. An address assignment to a ST port for a particular destination address domain is valid for communicating with all ST ports that are in the same address domain.

Since the use of address translation impacts route distribution, there is a strong interplay between the Redirect Routing and Address Leasing protocols. For instance, an ST port may need to obtain an NAPT address via the Address Leasing mechanism prior to disseminating a Redirect route to a peer ST port.

An ST running ISRP is assumed to have a route table, containing information about routes to a number of destination networks reachable from the ST. For ISRP, each route described in the route table, in an exemplary embodiment, includes: IP address of the destination, address of the next-hop, a cost-metric, and a route change flag. For IPv4, a four-octet IPv4 address and a four-octet network mask, together specify the network/subnet number of the destination. For IPv6, a variable-length network prefix of the destination is used. The address of the node is specified as the next-hop for forwarding packets to the destination; this address can be a sixteen-octet satellite next-hop address. Alternatively, the address may be an IPv4 or IPv6 address of a next-hop router reachable over the terrestrial interface. The cost-metric associated with the route indicates the cost of forwarding an IP packet to the destination along the route specified by this entry. The route change flag indicates whether a route has recently changed.

In one embodiment of the present invention, the route table at the ST has logical divisions: one describing routes reachable over the air interface, and the other describing routes reachable over the terrestrial interface(s). Routes learned via ISRP are used to update only the part of the route table that describes connectivity over the air interface. Updates to the other part are considered to be the responsibility of the terrestrial routing protocol. ISRP specifies unrestricted read access to this section of the route table, allowing the protocol to access the above-mentioned information associated with all the routes described in this part of the route table. It is noted that this division is only a logical division; when implemented, a single physical database may be used.

As described with respect to FIG. 2, an ST can be pre-configured with a number of static routes including a default route. This may include routes towards "global" addresses managed by the NAT/NAPT function at the ST, for assignment on a temporary basis to hosts. ISRP can advertise any such pre-configured static routes on the air interface, with the exception that the default route is not advertised.

Because two different routing protocols are used at the ST at the different interfaces, protocol internetworking is required to communicate route changes learned at one interface using one protocol to the other interface using another protocol. This inter-conversion is specific to the terrestrial protocol that is being used. The operation of ISRP, however, is largely independent of the terrestrial protocol. A number of assumptions are made with respect to the execution of the ISRP. First, an external trigger signals the receipt of a terrestrial routing update. Second, this triggers the ISRP route client to re-evaluate whether sending of a route update over the air interface is warranted by any changes in terrestrial connectivity that may have occurred.

The ST also has the capability to indicate to the terrestrial routing protocol any change in connectivity over the air-interface, learned via ISRP routing updates obtained at the air interface. The terrestrial routing protocol accordingly makes an independent determination as to whether a triggered update is warranted (or if any other action is required) to communicate the route changes over the terrestrial interface. It is recognized that any terrestrial routing protocol can be used in conjunction with ISRP Routing. The general rules associated with inter-working between the ISRP Routing protocol and the terrestrial protocol are as follows. Route changes detected at the terrestrial interface by the terrestrial protocol are to be indicated to the ISRP protocol within a reasonable time; e.g., such that the time delay from the detection of route changes to their indication to the ISRP module is no worse than the maximum time delay allowed by the terrestrial routing protocol for route change propagation between two interfaces. Additionally, route changes learned over the air via ISRP Routing, once conveyed to the terrestrial routing protocol are processed in a manner similar to the behavior of the terrestrial routing protocol as if the route changes were learned using the same protocol.

Figure 3:
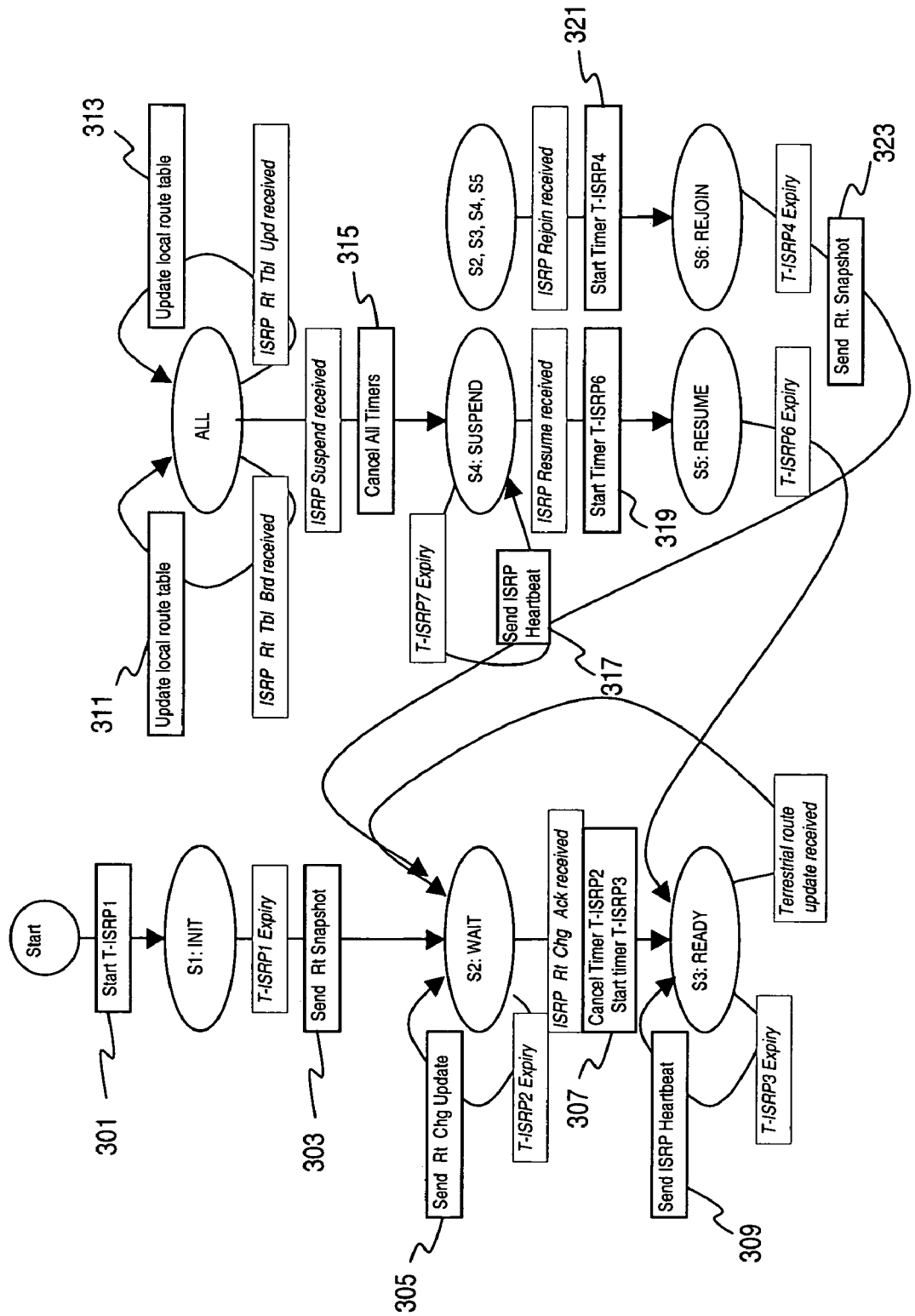
FIG. 3 is a diagram of a finite state machine of an Internal Satellite Routing Protocol (ISRP) client, according to an embodiment of the present invention.

FIG. 3 is a diagram of a finite state machine of an Internal Satellite Routing Protocol (ISRP) client, according to an embodiment of the present invention. The ISRP route client maintains and operates on the following data during normal operation: route table version number, learned routes, changed terrestrial routes, Route Change Update/Route Snapshot, last route change update number, and various timers (which are detailed below). The route table version number is the route table version learned in the last successfully assimilated Route Table Update or Broadcast message received from the route server 215. This version number is used to determine if the route table at the route client is in line with the latest route database at the route server 215. The number is captured in the Route Change Update or Route Snapshot messages as well as Heartbeat messages that are sent to the route server 215. The ISRP route client also maintains a collection of learned routes; these routes are learned over the air interface, and are not yet committed to the local route table at the ST. This data contains part of a Route Table Broadcast message or a Route Table Update message that has not been completely received by the route client, and is awaiting committal. Associated with each database is a version number that indicates the version number that will be assigned to the local table when the routes in the database are committed to the local route table.

Additionally, the ISRP route client stores a collection of terrestrial routes that have recently changed and need to be communicated over the air interface. It is noted that this does not include any portion for which a Route Change Update message or a Route Snapshot message has already been sent and, therefore, for which an acknowledgement is pending. The ISRP route client also stores a copy of a Route Change Update message or a Route Snapshot message for which an acknowledgement from the route server 215 is pending.

The last route change update number is advertised in the last Route Change Update message or Route Snapshot message that is sent to the route server 215, for which a successful acknowledgement was received from the route server 215.

It is noted that in bootstrapping mode operation, the ISRP client does not require the route table version number, such that in any outgoing message, the route table version number is set to zero.

On the server side, the ISRP route server utilizes the following data during normal operation: Route table version number, committed routes, route update history, collected route updates, Out-of-Sync Clients, Active Clients, Expired Clients, Last Route Change Update Number learned per client, and various timers. The Route table version number represents the latest version of the central route database at the route server 215. The route database stores committed routes collected from all the route clients.

A database of Limited Update History is also provided by the ISRP route server, whereby each entry reflects route updates over a past version that was applied to the central database to bring it to a later version. This database is used to preserve a limited amount of past history of updates, enabling the route server 215 to send limited updates to route clients that are determined to be out of sync with the central route database.

The route server 215 also collects route updates from the route clients. These updates, in an exemplary embodiment, are committed to the central route database periodically. This period is known as the route collection period, and any updates received during this time are not committed. This collection of uncommitted route updates constitutes a database of collected updates.

The route server 215 stores a list of Out-of-Sync clients, which have reported an incorrect route table version number in the last message received from them. The reported route table version is also stored. In addition, the route server 215 maintains a list of active route clients. Associated with each active client is a running timer T-ISRP11 (such timers are described in Table 3, below). When this timer expires the route client is removed from the list and added to the list of expired clients. Further, the route server 215 may optionally keep track of the expired route clients using a list. This list permits the route server 215 to determine when these clients become active again as to trigger re-initialization of these route clients. Such a list can also be used to troubleshoot network problems.

As with the client side, the route server 215, when in bootstrapping mode, does not need the following data: route table version number, Limited Update History, and Out-of-Sync clients.

The ISRP route client maintains a number of timers during operation for both full Core Routing support and Bootstrapping support. Table 3 below enumerates exemplary timers employed in the operation of the ISRP:

TABLE 3

| TIMER | PARAMETERS | VALUE | DESCRIPTION |
| --- | --- | --- | --- |
| T-ISRP1 | X{min = 30, max = n/a, def = 30} | T = u(X/2, 3X/2) sec | This timer is started at system initialization to wait for terrestrial routes to be collected before sending a Route Snapshot message. The timer is stopped if an ISRP Suspend message is received. At expiry a Route Snapshot message is sent advertising all terrestrial routes. |
| T-ISRP2 | X{min = 1, max = n/a, def = 30} | T = X sec | This timer is started after sending a Route Change Update message or Route Snapshot message. The timer is stopped when a corresponding Ack is received from the route server. At expiry the Route Change Update/Route Snapshot is sent again until the number of failed, consecutive retries reaches a pre-configured value, at which time the connection with the server is deemed broken, and an alarm is raised. |

TABLE 3-continued

| TIMER | PARAMETERS | VALUE | DESCRIPTION |
|---|---|---|---|
| T-ISRP3 | X{min = 30, max = n/a, def = 60} | T = u(X/2, 3X/2) sec | This timer is restarted after sending an ISRP Heartbeat message. The timer is stopped if an ISRP Suspend message is received, or when an ISRP Route Change Update message or Route Snapshot message is sent. At expiry an ISRP Heartbeat is sent. |
| T-ISRP4 | X{min = 30, max = n/a, def = 30} | T = u(0, X) sec | This timer is started after receiving an ISRP Rejoin message to wait for a random time before sending an ISRP Route Snapshot message. The timer is stopped if an ISRP Suspend message is received. At expiry a Route Snapshot message is sent advertising all terrestrial routes. |
| T-ISRP5 | X{min = 3, max = n/a, def = 3} | T = X min | This timer is started when the cost of a route learned over the satellite network is updated to infinity. At expiry, the associated route entry is deleted. |
| T-ISRP6 | | T = T-ISRP4 | This timer is started after receiving an ISRP Resume message to wait for a random time before sending a Route Change Update/Route Snapshot, if required. The timer is stopped if an ISRP Suspend message is received. At expiry a Route Change Update message or Route Snapshot message is sent, if required. |
| T-ISRP7 | | T = 2 * T-ISRP3 | This timer is started when an ISRP Suspend message is received and restarted at any subsequent receipts of an ISRP Suspend message, Route Table Broadcast or Route Table Update messages. The timer is stopped when an ISRP Rejoin or Resume message is received. At expiry an ISRP Heartbeat message is sent. |

As seen in FIG. 3, the timer T-ISRP1 is started (as in step 301) to enter an initialization state S1 by the ISRP route client. The ISRP route client on initialization deletes all route entries in the route table with next-hop over the satellite network. Any pre-configured static routes are not deleted. The route table version number of the local route table is set to zero. Upon T-ISRP1 expiry, an ISRP Route Snapshot message is sent, as in step 303, transitioning into a Wait state S2. The purpose of the T-ISRP1 timer is to provide a period for collecting terrestrial updates, so as to avoid sending a barrage of route updates at startup.

During the Wait state S2, another timer, T-ISRP2, is commenced, during which a Route Change Update message is sent, per step 305. When an ISRP Route Change Acknowledgement (Ack) message is received, the T-ISRP2 timer is stopped, and a new T-ISRP3 timer is started (step 307). The route client thus enters a Ready state S3. In particular, if the route client receives a (positive) Route Change acknowledgement with a particular Route Change Update Number for the first time after sending a Route Change Update message or Route Snapshot message with the same Route Change Update Number (i.e., this particular acknowledgement was pending), and while timer T-ISRP2 is running, the route client stops the timer. The route client then checks if any changed routes (present in the collection of changed terrestrial routes) are pending to be sent. If there are, the route client sends exactly one Route Change Update message or Route Snapshot message (step 305) comprising as many routes as can fit in, and starts a T-ISRP2 timer.

T-ISRP2 expiry indicates that a time-out occurred while waiting for an acknowledgement for a Route Change Update or Route Snapshot message. The Route Change Update message or Route Snapshot message is sent again and timer T-ISRP2 is re-started. The retry procedure at T-ISRP2 expiry is attempted a maximum of T-ISRP2-Retries consecutive times. When the number of consecutive retries exceeds this configured value, the route client considers the link with the server to be broken. It may then go into the suspended state, recovery from which will be the responsibility of network management, or attempt recovery by re-initializing.

It is noted that any route changes that could not be sent at this time are preserved and will be reported in a subsequent Route Change Update to the route server 215. If no changed routes are pending to be sent, the route client starts timer T-ISRP3.

If the Route Change Acknowledgement message is received with a Route Change Update Number that does not correspond to the most recently sent Route Change Update message or Route Snapshot message for which an acknowledgment is pending, or if no acknowledgement is pending the message is disregarded.

If the route client receives a Route Change Acknowledgement indicating failure (i.e., negative acknowledgement), the route client reports the failure to an appropriate management entity (not shown) to take the appropriate action. If the failure code indicates the cause to be suspension of the route client, the route client enters the Suspend state S4. A negative acknowledgement indicates that the contents of the corresponding Route Change Update message or Route Snapshot message were not assimilated by the server, and therefore these are resent when the route client comes out of the Suspend state S4.

A route table update trigger is received when the terrestrial routing protocol updates the local route table. If either of the timers T-ISRP1 or T-ISRP4 is running, the trigger is disregarded. Otherwise, this trigger invokes the procedure for sending an ISRP Route Change Update message or Route Snapshot message described below—if an acknowledgement for a previously sent Route Change Update message or Route Snapshot message is not pending and if timer T-ISRP6 is not running. If an acknowledgement is pending or if timer T-ISRP6 is running, the collection of changed routes is updated reflecting the new changes in terrestrial connectivity. It is not necessary for this trigger to be immediately generated at the instance a terrestrial update is received. In fact, according to one embodiment of the present invention, frequent terrestrial routing updates are suppressed for short intervals of time, such that an aggregate local route table update trigger is generated.

When the ISRP Route Change Update/Route Snapshot send procedure is triggered, the ST looks up its route table and collects all route entries with next-hop over the terrestrial interface that recently changed. A changed entry is indicated by the value of the route change flag associated with the route. It is noted that a Route Snapshot message is necessarily used as the first message after initialization and once a positive acknowledgement is received for the Route Snapshot message all subsequent route updates/changes are sent using Route Change Update messages. A maximal number of entries are compiled into a single Route Change Update message or Route Snapshot message and transmitted to the route server 215. The remaining entries are stored in a database of changed routes, and are sent at the next Route Change Update/Route Snapshot transmission opportunity. At this point, the timer T-ISRP2 is started, and the timer T-ISRP3 is stopped.

Each Route Change Update message or Route Snapshot message contains a Route Change Update Number, which is based on an incrementing counter. In a Route Snapshot message, the Route Change Update Number is set to one, for example. In each subsequent Route Change Update message, this number is incremented by one. However, if a Route Change Update message is not acknowledged by the server and times out, the number is not incremented in the next message that is sent. Also, the number is not incremented if the previous Route Change Update message was acknowledged if the acknowledgement was negative.

When the T-ISRP3 timer expires, an ISRP heartbeat message is sent, as in step 309. A transition from the Ready state S3 to the Wait state S2 occurs upon receipt of a terrestrial route update.

Incoming ISRP Route Table Broadcast messages are processed by starting a timer, T-ISRP7. In either scenario, the route client then compares the Route Table Version in the message with the Route Table Version of the local route table. If the route table version in the incoming message is less than or equal to the route table version of the local route table the message is discarded. It is noted that route table version wrap-around is handled by the route server 215 by suspending and then rejoining the route clients, before sending a Route Table Broadcast message. It is of no concern if an Update is sent after wrap-around, since the Update message specifies the base version. If the route table version in the message is greater than the route table version of the local route table, the local route table needs to be updated (per step 311).

The local route table update involves first unmarking the route change flag of all existing entries in the route table with next-hop over the satellite network. As routes are added or modified the associated route change flags are set to identify the updated routes. At the completion of processing of the Route Table Broadcast message, if this flag is not set for an entry, the associated entry's cost is updated to infinity and a timer T-ISRP5 is started to garbage-collect the entry. T-ISRP5 expiry is handled by deleting the associated route entry from the route table.

Next, the route advertisements received in the Broadcast message are used to reconstruct the route table. The broadcast message may contain multiple advertisements (with distinct next hop addresses) for the same network address-mask pair. The route client is expected to update the route table with the route advertising the least cost for a particular network address-mask pair. Before updating the route table with a learned entry, the route client may modify the cost of the route to reflect the cost of the next-hop. In the simplest case, an increment of the cost by one may be sufficient, assuming the cost metric advertised is the number of hops to reach the destination. For example, if RIP is being used, changing the cost of a satellite hop to a value different than the normal value of one impacts RIP operation since infinity is approached more quickly.

The resultant best route for each network address-mask pair replaces the existing route for the same network address-mask pair, if such a route exists. The route change flag for the route entry that was unset at the commencement of the Route Table Broadcast assimilation is set. Otherwise, the route is simply added. If the cost of the route thus inserted is infinity, timer T-ISRP5 for the entry is started. At the expiry of this timer the route entry are deleted.

The route server 215 may split its route table across multiple broadcast messages (denoted as "chunks"). The route client has the responsibility of maintaining a history of Route Table Broadcast sequence numbers of the latest incompletely received Route Table Broadcast message (i.e., the Route table broadcast with the highest version number seen), if a Route table update with a higher version has not been received. The history permits the route client to determine if all the chunks of the route table broadcast message have been received. When all chunks have been received, the route client deletes the history, commits the routes received in the broadcast, and updates the version number of the local route table. As each chunk is received, it is buffered in the database of learned routes. When all the chunks have been received, the buffered routes are processed in the fashion described earlier and the route changes are committed to the local route table. According to one embodiment of the present invention, a Route Table Broadcast message is buffered until the message is completely received. To reduce the memory requirement at the ST, the route client may process each chunk as the chunk is received to discard the redundant route entries from the buffer of learned routes. As each chunk is received, the chunk is processed entry by entry to determine whether that entry needs to be buffered. The entry needs to be buffered only if it is the best route among the routes learned (from the same Route Table Broadcast) for the same destination network address-mask pair. At the completion of Broadcast processing, an external trigger is generated to notify the terrestrial routing protocol of a routing update.

The route table version number in an incoming Route Table Broadcast message is checked to identify the situation, and to invoke appropriate handling, when a Broadcast-set processing has already commenced because of the earlier receipt of a chunk of the same Broadcast-set. If the route client has not received all the chunks of a route table broadcast, but receives a Route Table Broadcast message with an even higher Route Table Version, the client will delete the history collected thus far, including any buffered routes that comprise an incompletely received Route Table Broadcast message. The newly received broadcast will then be processed as usual. If the route client has not received all chunks of a Route Table Broadcast message and receives a Route Table Update with a base version number that is higher than the version number of the incompletely received Broadcast, the newly received Update is not processed.

As evident from FIG. 3, incoming ISRP Route Table Update messages are handled in similar fashion as that of ISRP Route Table Broadcast messages. Namely, if timer T-ISRP7 is running, the timer is restarted. Also, the route client compares the Route Table Version in the message with the Route Table Version of the local route table. If the route table version in the incoming message is less than or equal to the route table version of the local route table, the message is discarded. However, if the route table version in the message is greater than the route table version of the local route table, and the base route table version in the message matches the local version, the route table is updated, as in step 313.

The update involves replacing the entry in the route table for a certain network address and mask pair, by the corresponding entry (i.e., with the same network address and mask), in the received message, if one exists, and the cost of the existing route is more than the (adjusted) cost of the new route. Since an update message may contain multiple routes for the same destination, the best route is used to replace the pre-existing route. Also if the update contains a route reflecting a new cost for the same next-hop as the pre-existing route in the route table, the cost is updated to the new one before considering other routes in the update message.

If a matching entry does not exist, the route is added to the route table. The cost of the route is adjusted appropriately. If the route inserted in the route table has a cost of infinity, timer T-ISRP5 is started to garbage-collect the entry at timer expiry. As an entry is updated or added, the associated route change flag is set.

As in the case of the Route Table Broadcast messages, the route server 215 can send the route table update across multiple Route Table Update messages as chunks.

If the route client receives an ISRP Suspend message, the route client will not send any ISRP message to the route server 215, with the exception of ISRP Heartbeat message with suspend indication, until it subsequently receives an ISRP Rejoin message or an ISRP Resume message. On receiving an ISRP Suspend message, any active T-ISRP1, T-ISRP2, T-ISRP3 and T-ISRP4 timers are canceled, per step 315, and the Suspend state S4 is entered. If the timer T-ISRP7 is running, the timer is restarted. Upon expiration of the T-ISRP7 timer, the route client sends an ISRP Heartbeat message to the route server 215, per step 317. The route client remains in the Suspend state S4. The ISRP Heartbeat message contains the version number of the local route table, as well as the same route change update number as the one sent in the last positively acknowledged ISRP Route Change Update message or Route Snapshot message. The timer T-ISRP3 is restarted if the route client is not in the Suspend state S4, otherwise timer T-ISRP7 is restarted.

Any history of incompletely collected route table broadcast or update message is preserved, as the route client processes any Route Table Broadcast or Update messages received after a Suspend message in the usual fashion. Any changed terrestrial routes remaining to be sent are preserved, as well as any history of an unacknowledged Route Change Update message or Route Snapshot message.

In the Suspend state S4, when the route client receives the first ISRP Resume message after receiving an ISRP Suspend message, the route client resumes normal operation, whereby Timer T-ISRP7 is stopped. The route client then, per step 319, starts a timer T-ISRP6 to wait for a random time before sending any Route Change Updates/Route Snapshot messages, if required, thereby entering the Resume state S5. If an ISRP Resume message is received when the route client is not in the Suspend state S4, the message is disregarded.

From states S2-S5, a receipt of an ISRP Rejoin message triggers the start of a timer T-ISRP4 (per step 321) and a transition into a Rejoin state S6. When the route client receives the ISRP Rejoin message when neither timer T-ISRP1 nor timer T-ISRP4 is running, the client deletes all dynamically learned route entries with next-hop over the satellite network from its route table and changes the route table version number to zero. The history associated with incompletely received Route Table Broadcast or Update messages is also deleted, including any partially collected Broadcasts messages. Any changed terrestrial routes that were not communicated to the route server 215 are deleted, as is any past history of an unacknowledged Route Change Update message or Route Snapshot message.

The route client then starts timer T-ISRP4 to wait for a random time before sending a Route Snapshot. Upon T-ISRP4 expiry, the route client sends a Route Snapshot, as in step 323. Any ISRP rejoin received when either timer T-ISRP1 or timer T-ISRP4 is running is disregarded.

Figure 4:
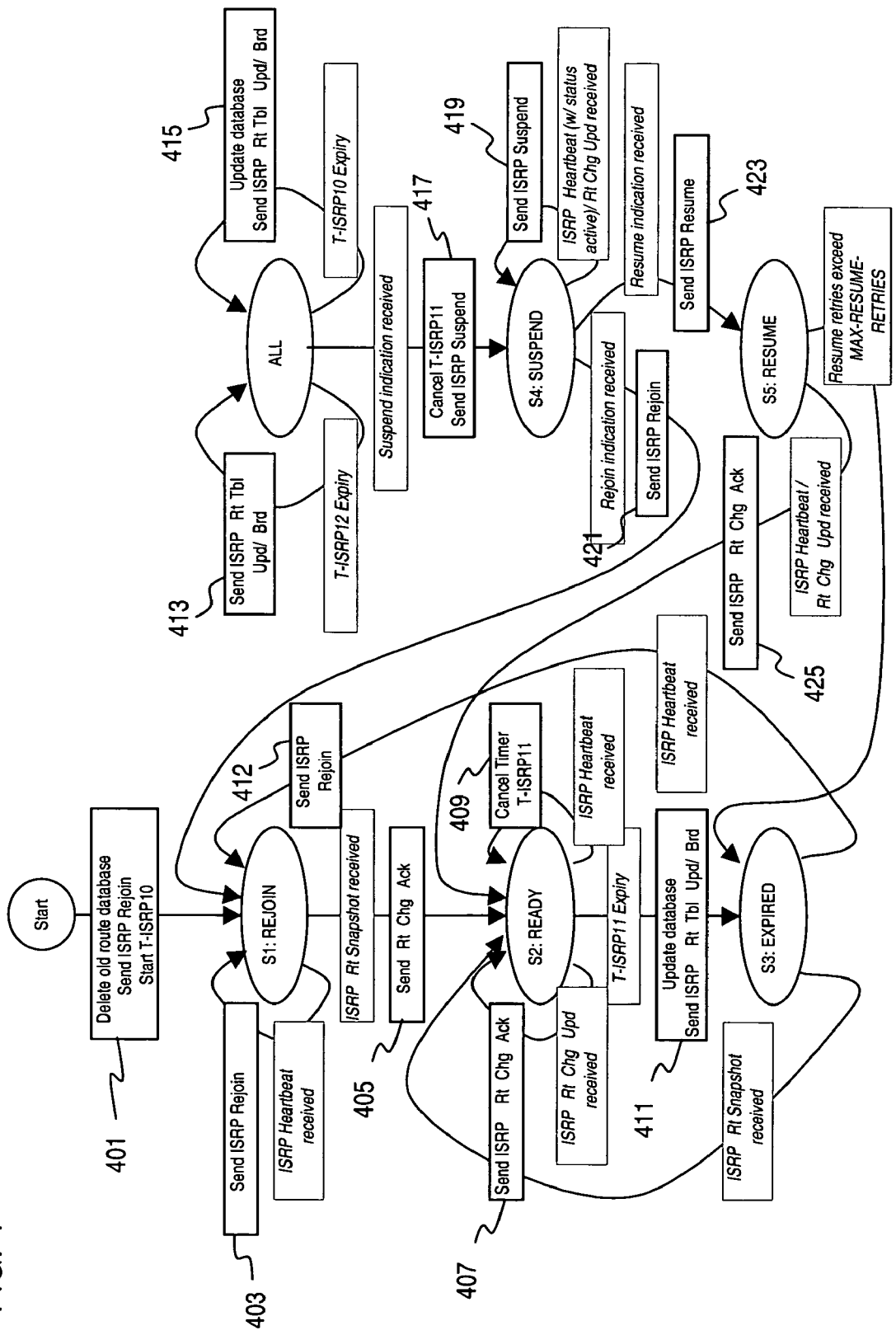
FIG. 4 is a diagram of a finite state machine of an Internal Satellite Routing Protocol (ISRP) server, according to an embodiment of the present invention.

FIG. 4 is a diagram of a finite state machine of an Internal Satellite Routing Protocol (ISRP) server, according to an embodiment of the present invention. The route server 215 on initialization deletes all the routes collected over the space link, per step 401, and then sends a multicast ISRP Rejoin message to all route clients, thereby transitioning to a Rejoin state S1. If an ISRP heartbeat is received, the route server 215 sends an ISRP Rejoin message to the route clients (step 403). The route server 215 then starts timer T-ISRP10.

Table 4, below, lists the timers utilized by the route server 215.

TABLE 4

| TIMER | PARAMETERS | VALUE | DESCRIPTION |
|---|---|---|---|
| T-ISRP10 | X{min = 120, max = n/a, def = 120} | T = X sec | This timer is started after receiving a Route Change Update message or Route Snapshot message when the timer is not already running. The timer is stopped when a triggered update is sent. When the timer expires either of Route Table Broadcast/Route Table Update may be sent. For Bootstrapping mode: Timer expiry triggers the incorporation of all collected routes and route changes into the local route table. |
| T-ISRP11 | X{min = 1, max = n/a, def = 5} | T = X min | This timer is started on a per client basis, when an ISRP Heartbeat message or an ISRP Route Change Update/Route Snapshot is received from the route client. The route server expects to receive another ISRP Heartbeat message or Route Change Update/Route Snapshot from the route client before the expiry of this timer. The timer is re-started if a Route Change Update/Route Snapshot or a Heartbeat message is received from the route client. At expiry the route client is considered to be non-reachable and routes advertised by the route client are deleted. |
| T-ISRP12 | X{min = 1, max = 30, def = 5} | T = X sec | This timer is started when a route client message is received with the incorrect route table version number. Timer is stopped at T-ISRP10 expiry. Expiry of this timer triggers sending of Route Table Update/Broadcast messages by the server to the route clients that advertised the incorrect route table version. |
| T-ISRP13 (Optional) | X{min = 3, max = n/a, def = 3} | T = X sec | This timer is started after sending a triggered update to the route clients. If another update is triggered before the timer expires, the update is suppressed till the expiry occurs. At timer expiry a Route Table Broadcast/Update is sent, if required. For Bootstrapping mode: The timer is started after a triggered update is applied to the local route table, rather than after sending a triggered update to clients. At expiry of this timer, an update to the local route table is made, if required. |

Upon receipt of an ISRP Route Snapshot message from a route client, the route server 215, as in step 405, replies with a Route Change Acknowledgement message, triggering a transition to a Ready state S2. This state is maintained when an ISRP Route Change Update message is received; the route server 215 acknowledges receipt of this message by transmitting an ISRP Route Change Acknowledgement message, per step 407. A Route Change Acknowledgement message is sent to acknowledge the receipt of a Route Change Update message or Route Snapshot message, irrespective of the route table version number received in the Route Change Update message. The message, in an exemplary embodiment, contains the version number of the current route database in the Route Table Version field. The Route Change Update Sequence number is copied from the corresponding field in the Route Change Update message or Route Snapshot message. The message can be sent as a unicast to the route client. If the contents of the Route Change Update message or Route Snapshot message were assimilated successfully success is indicated in the status code, otherwise failure is indicated and the appropriate failure code set, if known. A specific case occurs when a Route Change Update message or Route Snapshot message is received from a suspended route client. In this case, the appropriate code is set to indicate a suspended route client.

In the Ready state S2, the route server 215 cancels the timer T-ISRP11, per step 409, in response to receiving an ISRP heartbeat. T-ISRP11 expiry indicates that an ISRP Heartbeat message or an ISRP Route Change Update message or Route Snapshot message was not received for a certain period of time from the particular route client with which the timer instance is associated. The route server 215 assumes the link with the route client to be broken. The route server 215 then compiles a set of route entries, the compiled updates reflecting the update that would be received from the route client if the route client were to advertise entries indicating total loss of reachability for all previously advertised networks. This implies that for each entry in the route database with a next-hop towards the ST at which the route client is resident, an entry is generated by the route server 215 modifying the cost of the route to infinity. The original entry in the route database is deleted. Timer T-ISRP10 is stopped and these compiled entries and the routes collected thus far from other route clients are distributed to all route clients, and the route database is updated in exactly the manner that would be followed if T-ISRP10 had expired. The route client is added to the list of expired clients.

The procedure for processing of incoming ISRP heartbeat messages by the route server 215 is as follows. On receiving an ISRP Heartbeat message (not indicating a failure) from a route client that is not suspended (i.e., not present in the list of suspended route clients), timer T-ISRP11 associated with that route client is restarted. The route table version is then inspected to check if it is different from the version of the route database. If this version is less than the version of the route database, the route client is added to the list of route clients that have reported an incorrect route table version number in the current sync aggregation period. If no such list exists, it is created, and timer T-ISRP12 is started. T-ISRP12 expiry indicates the end of a sync aggregation period. One or more out-of-sync route clients were detected. The history of out-of-sync route clients is deleted.

If the version number in the heartbeat is greater than the version number of the route database, an ISRP Rejoin message is sent to the route client. Also, if the route change update number is not the same as the route change update number in the last Route Change Update message or Route Snapshot message that was positively acknowledged, an ISRP Rejoin message is sent to the route client.

If an ISRP Heartbeat message with a failure indication is received, a point to point Route Table Broadcast message is sent to the route client.

When in the bootstrapping mode, the route server 215 discards incoming Heartbeat messages with a route table version number other than zero, and need not provide further checking of the route table version number in incoming messages. Also, ISRP Heartbeat messages with failure indication are discarded.

At expiry of the timer T-ISRP11, the route server 215 updates its database of routes and sends such routes to the route clients via an ISRP Route Table Update message or ISRP Route Table Broadcast message (step 411). The route server 215 then enters an Expired state S3. The database includes routes advertised by each ISRP route client. This database is associated with a version number, such that a null database is assigned a version number of zero. A receipt of a Heartbeat message triggers the route server 215 to send an ISRP Rejoin message, per step 412, thereby returning to the Rejoin state S1.

The ISRP route clients may need to be updated with the latest route information either at the end of a collection period or at the end of a sync aggregation period. The route server 215 performs the following procedures to determine which message or messages need to be sent to update the route clients at the end of a route collection period—this period may coincide with the end of the sync aggregation period. This occurs when T-ISRP12 is found to be running at T-ISRP10 expiry. T-ISRP12 is stopped when this condition is detected.

T-ISRP10 expiry indicates the end of a route collection period. If timer T-ISRP13 is running, T-ISRP10 is simply restarted. Otherwise, the following processing is performed. Any running timer T-ISRP12 is stopped. Then, any required updates/broadcasts are compiled. After the required updates/broadcasts have been sent, the route database is updated with the collected route advertisements, the collected routes are stored along with the version number as part of the past history (this is only required if a Route Table Update was sent for the latest version number), any outdated update history is deleted.

At the end of the route collection period, the following processing is executed on the collected routes to determine the contents of a Route Table Update (that needs to be sent). Each route is examined to determine whether it is an old route for the same destination towards the same next-hop, or a new route (i.e., a corresponding route for the same destination previously advertised by the same route client exists). Receipt of an old route can result in all known routes for the same destination (with different next-hops) being sent out as part of the Update message. All routes, however, need not be sent if the route is a new route. If no out-of-sync route clients are present and a non-zero number of route updates were received in the previous collection period, the configured threshold is used to determine if a Broadcast message or an Update message is to be sent. This determination depends on the number of route entries that need to be updated at the route clients. If the threshold is exceeded a Route Table Broadcast message is sent, otherwise Route Table Update is sent multicast to the route clients.

If non-zero out-of-sync route clients are present (indicated by membership in the list of route clients that reported a route table version number less than the version number of the route database in the last sync aggregation period), the route server 215 makes a determination so as to optimally transmit the required updates to the route clients. This determination depends on the particular implementation; the route server 215 may transmit route updates in a variety of ways without violating the protocol. The route server 215 can send updates as a multicast or a unicast, using either Route Table Broadcast messages or Route Table Update messages.

By way of example, one approach to determining how to send the route updates is described as follows. At the end of the route collection period, the route server 215 builds a table indicating the number of route clients needing updates since a specific version. The number of route clients needing a certain incremental update-set (corresponding to a specific route database version) is then accumulated. A configured threshold is set to indicate whether, for a given number of route clients, the update/broadcast message should be sent as a unicast or a multicast message. All the incremental update-sets that are determined to be sent using multicast per this threshold are sent as multicast messages—one multicast for each incremental version update. The decision to send a Route Table Broadcast message or a Route Table Update message is made depending on the number of route entries that need to be updated in each incremental version update. If a multicast Route Table Broadcast message is sent, no other updates need to be sent. For the incremental update-sets that are determined to be sent using unicast messages, a single unicast message is constructed for each route client containing the aggregate of the updates required in this class. If the total number of route entries in this aggregate update exceeds the threshold, a unicast Route Table Broadcast message is sent to the route client.

The route server 215 collects route advertisements in the form of Route Change Update messages from each route client, without re-distributing them, for a certain time period (known as the route collection period) indicated by the timer T-ISRP10. This timer is started when a Route Change Update message or Route Snapshot message is received, if the timer is not already running. According to an embodiment of the present invention, these collected route updates are maintained separately from the most current route database.

When the timer T-ISRP10 expires, the route server 215 needs to either send a Route Table Broadcast message or a Route Table Update message to the route clients (per step 413), to update their route tables. Which type of message is sent by the route server 215 depends on a number of factors including, for example, the size of the routing update collected during the last collection period. It is recognized that transmission of an Update message is generally preferable over a Broadcast message, in that the Update messages minimize the amount of traffic over the satellite network. After sending either of these messages, the route database is updated with the entries collected over the last collection period, as in step 415.

The update process involves replacing the entry in the database with a particular next-hop address for a particular network address and mask pair with the corresponding entry (with identical next-hop address for the same network address and mask pair) in the collected updates. If no matching entry is found in the route database, the entry is added to the database. If the updated entry indicates a cost of infinity the entry is deleted from the route database. The route database version number is then incremented. It is noted that the route server may preserve a sent Route Table Update message in the database of update history for later use if required.

Each incoming ISRP Route Change Update message or Route Snapshot message is checked to verify that the route table version advertised in the message is the same as the version number of the route database at the route server 215 and that the Route Change Update Number is one greater than the last Route Change Update Number that has been positively acknowledged for that route client. It is noted that a Route Snapshot message with a Route Table Version other than zero is not permitted and is treated as a malformed message. Also the check against the route change update number is only performed for Route Change Update messages. Irrespective of the version number, the route entries in the route change update/snapshot are stored as part of the collected updates for the route collection period.

A Route Change Acknowledgment is sent to the route client, with the current version of the route database at the server and the Route Change Update Sequence number received in the Route Change Update message or Route Snapshot message. If the version number in the route change update is less than the version of the route database, then the route client has missed one or more route updates sent by the server. The route server 215 maintains a list of route clients that report an incorrect route table version number during a time-period referred to as the sync aggregation period. This period is determined by the value of the timer T-ISRP12, and its value is necessarily less than the collection period.

During a collection period, whenever the first message (from any route client) with an incorrect route table version is received, the route server 215 starts the timer T-ISRP12. At T-ISRP12 expiry, all the route clients that reported an incorrect route table version are either sent a point-to-point or multicast Route Table Broadcast message or a point-to-point Route Table Update message to bring the route clients up to sync with the route database at the route server 215. If T-ISRP10 expires before T-ISRP12, then T-ISRP12 is stopped. At this point the route server 215 may either send a single multicast Route Table Broadcast message to all route clients, or several point-to-point Route Table Broadcast messages and point-to-point/multicast Route Table Update messages as required.

For the case of deleted routes, optional special processing can be performed. When triggered updates are not implemented, all deleted routes are treated as normal route changes. If an ISRP Route Change Update with a deleted route (indicated by a cost of infinity) is received from a route client, it is treated as an immediate expiry of the route collection period. Any running timers T-ISRP10 and T-ISRP12 are stopped and the ISRP Route Table Broadcast/ Update send procedure is performed. Thus, receipt of deleted routes results in triggered updates being sent out. However, the frequency of these triggered updates is limited by the use of a timer T-ISRP13. This timer is started whenever a triggered update occurs. If another triggered update should occur before the expiry of T-ISRP13, the triggered update is delayed until the timer expires. T-ISRP13 expiry results in the server determining whether a triggered update needs to be sent. If this determination is in the affirmative, the route server 215 sends an Update/Broadcast, as described above, and the timer T-ISRP13 is re-started.

If the route table version received in the Route Change Update message is higher than the version of the route database, or if the Route Change Update Number in the message is neither equal to, nor one plus the last Route Change Update Number received for that route client, a point-to-point ISRP Rejoin message is sent to the route client. Otherwise, if a Route Change Update message is received with a route change update number that is equal to the last route change update number received for that route client then a positive acknowledgement is sent to the client.

When a Route Snapshot message is received from a route client the list of active route clients is checked to determine if the sender is active. If so, this is an indication that the route table may contain one or more routes previously advertised by the sender. Such Route Snapshot messages are processed in the normal fashion at the end of the route collection period. However, the following special processing is done immediately at the receipt of such a Route Snapshot message. Essentially all routes in the route database earlier advertised by the same route client are deleted immediately.

When a Route Snapshot message is received from a route client that is not present in the server's list of active route clients, the message is treated as a regular update and, therefore, added to the database of learned updates. The routes in the message are committed at the end of the route collection period. The route client is deleted from the list of expired route clients, if present in that list, and added to the list of active route clients.

Upon receiving a Suspend indication message, the route server 215 cancels the timer T-ISRP11 and sends an ISRP suspend, as in step 417, entering a Suspend state S4. The ISRP Suspend message may be sent by the route server 215 to suspend route client operation at any time. If after sending an ISRP Suspend message to a route client, a message (with the exception of a heartbeat with status field indicating a suspended route client) is received from a route client, the route server 215 sends a unicast ISRP Suspend message to the route client. The route server 215 does not, however, need to send an ISRP Suspend message if a Route Change Acknowledgement message with the appropriate failure code was sent to the route client (in response to a Route Change Update message or Route Snapshot message being received from a route client while the route client was supposed to be suspended).

The Suspend state S4 is maintained when an ISRP heartbeat (with status active) message or Route Change Update message is received, triggering transmission of an ISRP suspend, per step 419. That is, if an ISRP Heartbeat message is received with the status field indicating a non-suspended route client, after sending an ISRP Suspend message to the route client, with no intervening ISRP Rejoin or Resume message being sent (i.e., the route client is in the list of suspended clients), an ISRP Suspend message is sent to the route client. If an ISRP heartbeat with the status field indicating a suspended route client is received from a route client that is not present in the server's list of suspended clients, (but is present in the list of active clients), either one of ISRP Resume or ISRP Rejoin message is sent (per steps 421 and 423) to the route client, depending on the route table version number in the message. Thus, from the Suspend state S4, the route server 215 transitions to the Rejoin state S1 upon receiving a Rejoin indication and transmitting the ISRP Rejoin message (per step 421).

If a Resume indication message is received, the route server 215 sends an ISRP Resume message to the route client, as in step 423, and enters a Resume state S5. The ISRP Resume message is sent, if an ISRP Rejoin message is not sent. An ISRP Resume message may be sent following an ISRP Suspend message as either a unicast to a single route client, or a multicast to all route clients. The route client is removed from the list of suspended clients and added to the list of active clients.

Each time an ISRP Resume message is sent in the above-stated condition, a counter is incremented. The counter tracks the number of consecutive times an ISRP heartbeat with suspend indicator is received from an active route client. When the counter exceeds a predetermined maximum threshold (e.g., MAX-RESUME-RETRIES), the route client is considered expired and removed from the list of active clients. The route server 215 transitions to the Expired state S3. If an ISRP Heartbeat message is received from an expired or an unknown route client, an ISRP Rejoin message is sent to the route client. The ISRP Rejoin message can be unicast to a single route client, or multicast to all route clients; the route client is removed from the list of suspended clients, if present.

Upon receiving a Heartbeat message or a Route Change Update message, the route server 215 transmits a Route Change Acknowledgement message to the route client, per step 425. This then initiates a transition to the Ready state S2.

If a Route Change Update message is received following sending of an ISRP Suspend message to the same route client (or after sending a multicast ISRP Suspend message), with no intervening ISRP Rejoin or Resume message being sent, a negative Route Change Acknowledgement message with the appropriate failure code is sent to the route client. If the Route Change Update message is received from an expired route client or for a route client for which there is no state, an ISRP Rejoin message is sent to the route client.

In bootstrapping mode, the route server 215 operates as follows. Route table version number at the route server 215 is zero. Incoming Route Change Update messages with a route table version number other than zero are discarded. At the end of the collection period Route Table Broadcast/Route Table Update messages are not sent, and no database of limited update history needs to be maintained. At the end of the collection period the local route table is updated with the collected routes/route changes. Triggered updates (for deleted routes) are optional. The processing of triggered updates (when this feature is implemented) is as given above except that Route Table Update/Broadcast is not sent when the triggered updates are committed; the local route table is updated with the collected routes/route changes.

During operation, the route server 215 may discover the lack of synchronicity (of data) with a particular route client. All such error cases can be handled by deleting the route client from the active list, if present, and deleting all the routes previously advertised by that route client in a triggered update fashion. Furthermore, the route server 215 sends an ISRP Rejoin message to the afflicted route client(s). Also, unexpected, but otherwise well-formed, ISRP messages may be received from route clients. The route server 215 disregards all such messages.

The system 200 can deploy redundancy for the access gateway 213 by utilizing a primary access gateway and a secondary (or back-up) access gateway. The redundancy architecture requires backing-up of route server state so that a switchover to the back-up access gateway does not require re-initialization of all ISRP routing for the network. ISRP Core Routing provides a mechanism whereby recovery from loss of all or a portion of the route server 215 state due to access gateway switchover is possible. This is accomplished through the use of the Route Change Update number in the following way. Each route client maintains a local route change update number that is associated with the latest state of all routes successfully advertised by it to the route server 215. Whenever a Route Change Update message or Route Snapshot message is sent, the route client increments the stored route change update number by one and advertises it in the Update/Snapshot message. The stored value is updated when a positive acknowledgement for the Route Change Update message or Route Snapshot message is received. The stored value is also advertised in any Heartbeat messages sent.

The route server 215 maintains the route change update number corresponding to the last positively acknowledged Route Change Update message or Route Snapshot message received from the route client. This number is compared with the number received in any subsequent Route Change Update message or Route Snapshot message and Heartbeat message to determine if any loss of state of routes advertised by that route client has occurred. If loss of state is detected then the route client is instructed to rejoin by sending a point-to-point ISRP Rejoin message to the client.

Figure 5:
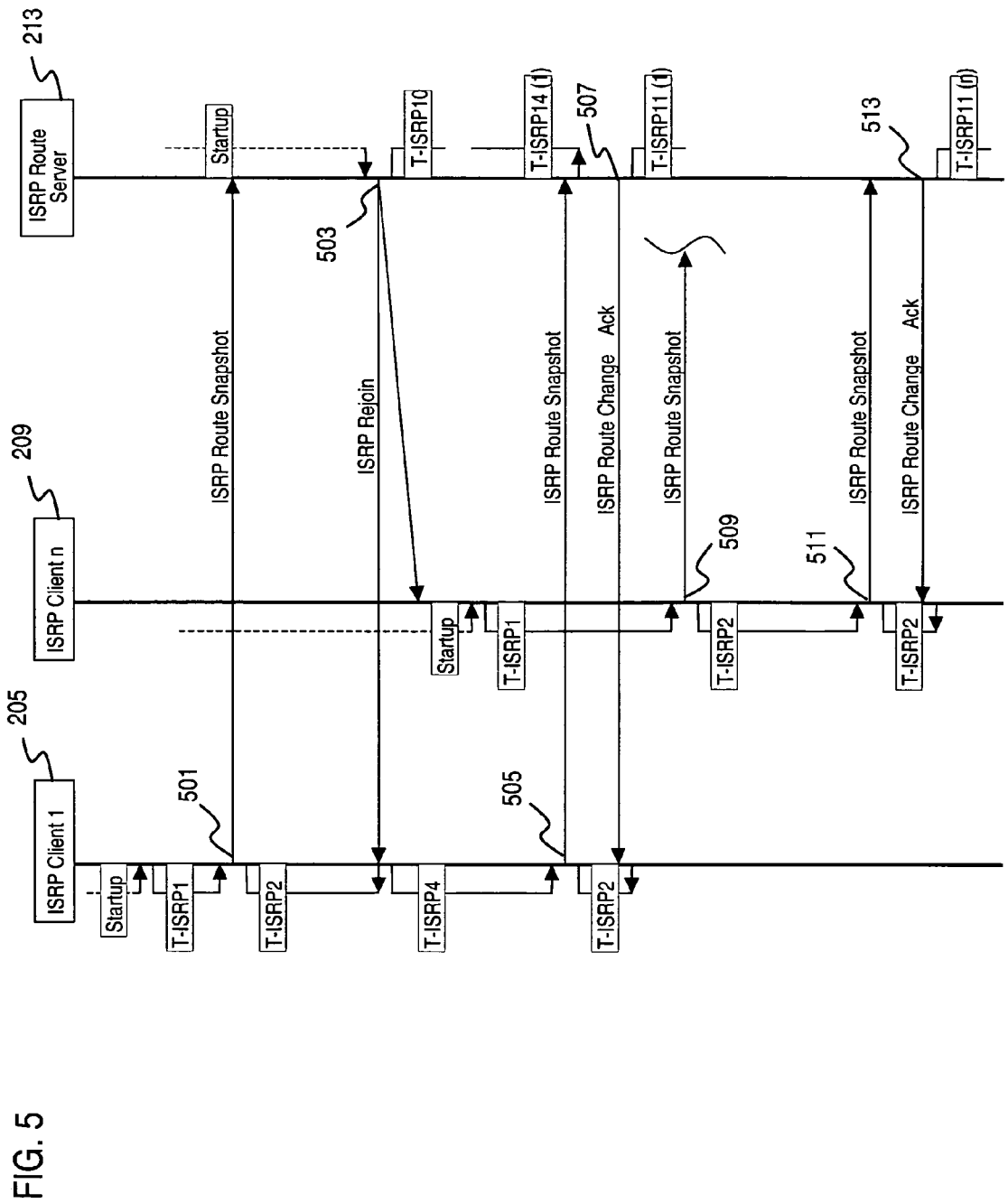
FIG. 5 is a sequence diagram of an initialization process among a route server and participating route clients, according to an embodiment of the present invention.

FIG. 5 is a sequence diagram of an initialization process between a route server and participating route clients, according to an embodiment of the present invention. As shown, multiple route clients (1 . . . n) communicate with an ISRP route server 215; for the purposes of explanation, the ISRP client 1 is deployed with ST 205 (FIG. 2) and ISRP client n resides in ST 209. Also, the ISRP route server is server 215 in the system of FIG. 2. The STs 205, 209 are thus configured to operate according to the finite state machine described in FIG. 3. Likewise, the route server 215 operates in accordance with the finite state machine of FIG. 4.

In this initialization process, after expiry of T-ISRP1, the ST 205 transmits an ISRP Route Snapshot message, as in step 501 to the route server 215. The ST 205 now starts timer T-ISRP2. Next, in step 503, the route server 215 responds with a multicast of an ISRP Rejoin message to STs 205, 209. Upon expiration of timer T-ISRP4, the ST 205 forwards another ISRP Route Snapshot message to the route server 215, per step 505. In turn, the route server 215 acknowledges, as in step 507, with an ISRP Route Change Acknowledgement message.

With respect to the ST 209, an ISRP Route Snapshot message is sent upon expiration of its timer T-ISRP1 (per step 509). However, the message is damage or lost; accordingly, after expiration of timer T-ISRP2, another ISRP Route Snapshot message is transmitted, per step 511, to the route server 215, which responds with an ISRP Route Change Acknowledgement message (step 513).

At this point, the route server has knowledge of all the routes from the clients 205, 209.

Figure 6:
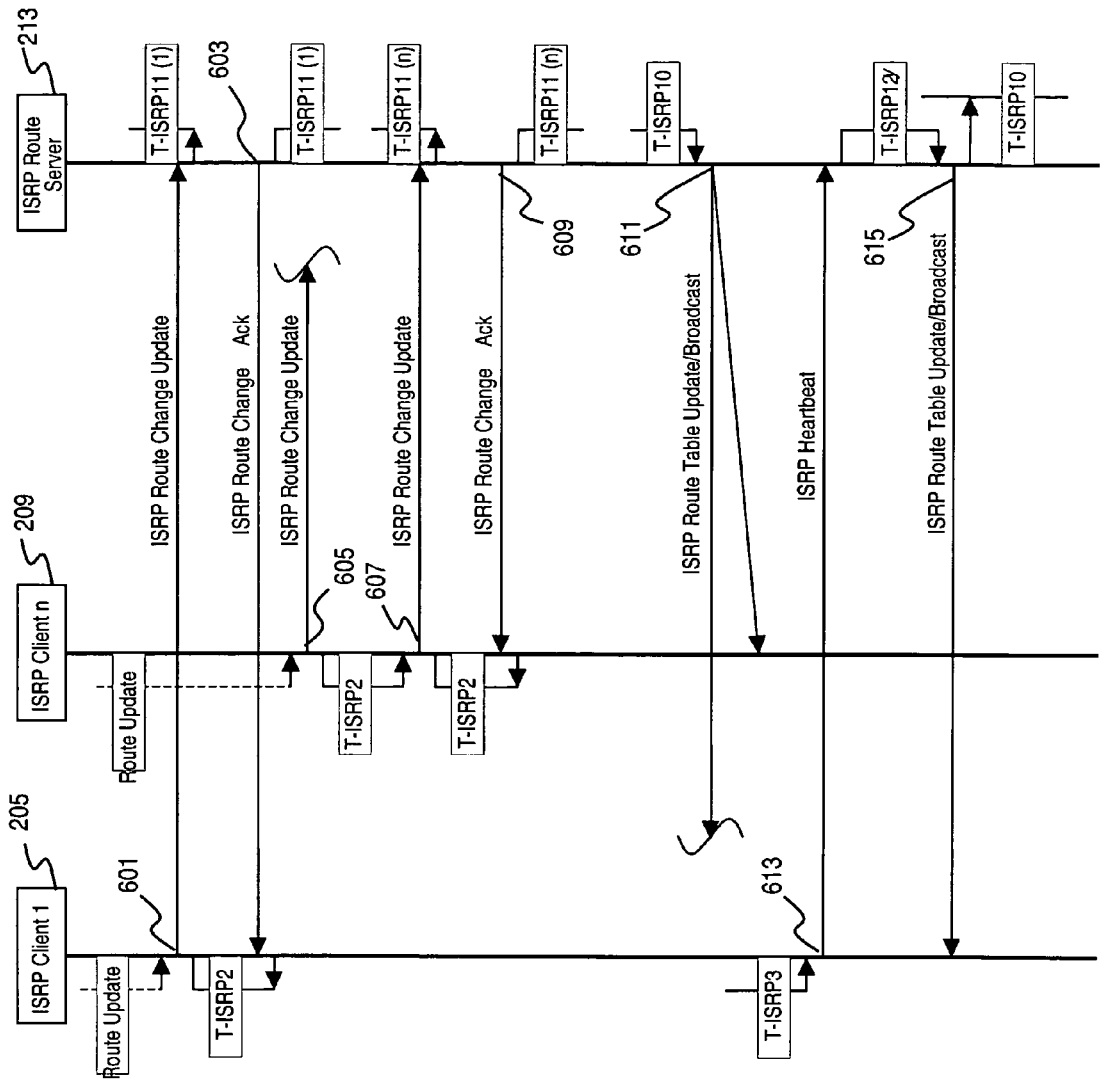
FIG. 6 is a sequence diagram of a route change update collection and distribution process among a route server and multiple route clients, according to an embodiment of the present invention.

FIG. 6 is a sequence diagram of a route change update collection and distribution process among a route server and multiple route clients, according to an embodiment of the present invention. Continuing with the example of FIG. 5, the ST 205 determines that a terrestrial route has changed, thus, triggering sending of an ISRP Route Change Update message to the route server 215, per step 601. Upon receipt of this message, the route server 215 responds, as in step 603, with an acknowledgement (i.e., ISRP Route Change Ack). Under this scenario, the ST 209 also notes a route change, and accordingly, attempts to send an ISRP Route Change Update message to the route server 215, as in step 605. Because the first attempt is unsuccessful, the ST 209 tries again, per step 607. This time, the route server 215 successfully receives the ISRP Route Change Update message, and replies with an ISRP Route Change Ack (step 609).

In step 611, the route server 215 transmits the updated route tables via an ISRP Route Table Update message or ISRP Route Table Broadcast message. As shown, the message does not reach the ST 205. Consequently, in step 613, the ST 205 transmits an ISRP Heartbeat message to the route server 215, causing the route server 215 to retransmit the ISRP Route Table Update message or ISRP Route Table Broadcast message (per step 615).

As seen in the above discussion in FIGS. 3-6, the route server 215 and ISRP client utilize a number of messages to convey routing information: ISRP Route Table Broadcast, ISRP Route Change Update, ISRP Route Change Acknowledgement, ISRP Route table Update, ISRP Heartbeat, ISRP Suspend, ISRP Rejoin, and ISRP Satellite Redirect. Exemplary formats of these messages are described below.

FIGS. 7a and 7b are diagrams of a Route Table Broadcast message and a format of a Route Table entry, respectively, used in a Satellite Routing Protocol, in accordance with an embodiment of the present invention. The route server 215 builds a single comprehensive route table and sends the ISRP Route Table Broadcast message to a given set of ST ports as identified by an IP multicast address. The route server 215 may use a Class-D Multicast Address (CMID) for IPv4 or an IPv6 Multicast address. The scenarios under which the route server 215 sends out ISRP Route Table Broadcast messages are discussed below. The behavior of the ST that receives the ISRP Route Table Broadcast message, is also detailed below. The value of INITIAL_ROUTE_TABLE is reserved for the ISRP Route Table Version number to indicate the initial route table.

As seen in FIG. 7a, the ISRP Route Table Broadcast message 700 includes the following: ISRP Version Number field 701, an ISRP Message Type (Route Table Broadcast) field 703, an ISRP Route Table Version field 705, an ISRP Table Broadcast Sequence Number (with first/last indication) field 707, a Number of Route Table Entries (N) field 709, and N*Satellite Route Table Entries 711.

Each table entry 711, as shown in FIG. 7b, has the following format: a Network Address (e.g., IPv4 or IPv6) field 713, a Subnet Mask field 715, a Next Hop Network Address field 717, a Satellite Context ID (SCID) field 719, and a Cost Metric field 721.

Figures 8A, 8B:
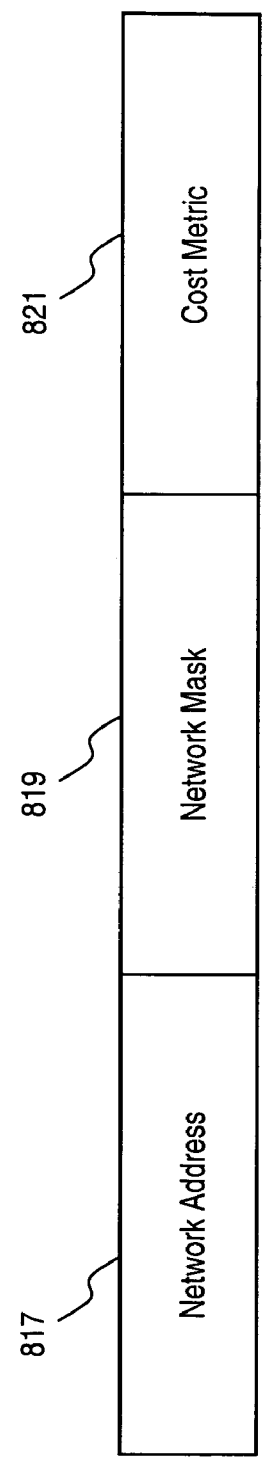
FIGS. 8a and 8b are diagrams of a Route Change Update message and a format of a route change update entry, respectively, used in an Internal Satellite Routing Protocol, in accordance with an embodiment of the present invention.

FIGS. 8a and 8b are diagrams of a Route Change Update message and a format of a route change update entry, respectively, used in a Satellite Routing Protocol, in accordance with an embodiment of the present invention. As RIP or OSPF at the ST recognize changes in the terrestrial networks connected to an ST, ISRP reports these changes to the route server 215 by way of a Route Change Update message. The message contains an update number that is used by the route server 215 to acknowledge reception of the ISRP Route Change Update message. According to one embodiment of the present invention, the Route Change Update message 800 has the following fields (as shown in FIG. 8a): an ISRP Version Number 801, ISRP Message Type (Route Change Update) 803, ISRP Route Table Version 805, ISRP Route Change Update Number 807, Next Hop Network (IPv4 or IPv6) Address 809, Satellite Context ID (SCID) 811, Number of Route Change Update Entries 813, and N*Satellite Route Change Update Entries 815. A Satellite Route Change Update entry, as seen in FIG. 8b, includes a Network Address field 817, a Network Mask field 819, and a Cost Metric field 821.

Figure 9:
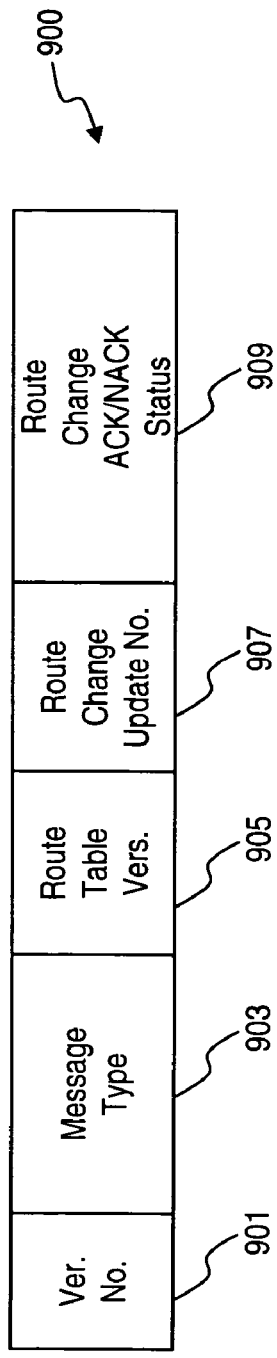
FIG. 9 is a diagram of a format of a Route Change Acknowledgement message used in an Internal Satellite Routing Protocol, according to an embodiment of the present invention.

FIG. 9 is a diagram of a format of a Route Change Acknowledgement message used in a Satellite Routing Protocol, according to an embodiment of the present invention. A Route Change Acknowledgement message 900 includes an ISRP Version Number field 901, an ISRP Message Type (Route Change Acknowledgement) field 903, an ISRP Route Table Version field 905, and an ISRP Route Change Update Number field 907, and an ISRP Route Change ACK/NACK Status with reason code field 909. The route server 215 acknowledges correct reception of the ISRP Route Change Update message, which includes verification of the Route Table version.

Figure 10:
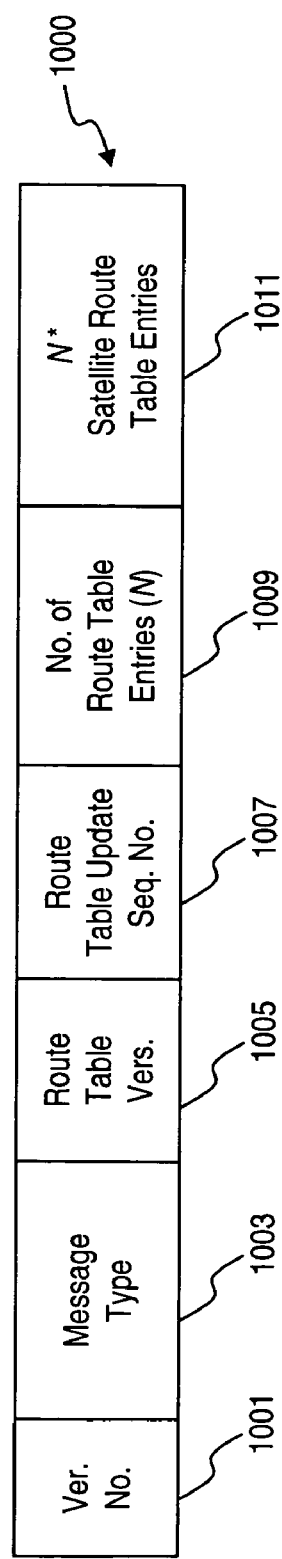
FIG. 10 is a diagram of a format of a Route Table Update message, according to an embodiment of the present invention.

FIG. 10 is a diagram of a format of a Route Table Update message, according to an embodiment of the present invention. A Route Table Update message 1000, according to the Satellite Routing Protocol, includes the following fields: an ISRP Version Number field 1001, an ISRP Message Type (Route table Update) field 1003, an ISRP Route Table Version field 1005, an ISRP Route Table Update Sequence Number (with first/last indication) field 1007, a Number of Route Table Entries (N) field 1009, and a field 1011 for containing N*Satellite Route Table Entries. The format of a route table entry is the as that shown for the Route Table Broadcast message 700 in FIG. 7b.

The Route Table Update message 1000 is sent by the route server 215 of an access gateway to a set of STs as identified by an MGID. This is a means of sending only the changes of the current route table (in a given interval of time) as shared by this set of STs. The behavior of the remote ST, which receives the ISRP Route Table Update message, is described in the ISRP/ST section below. The behavior of the route server 215, which sends the ISRP Route Table Update message, is described below.

Figure 11:
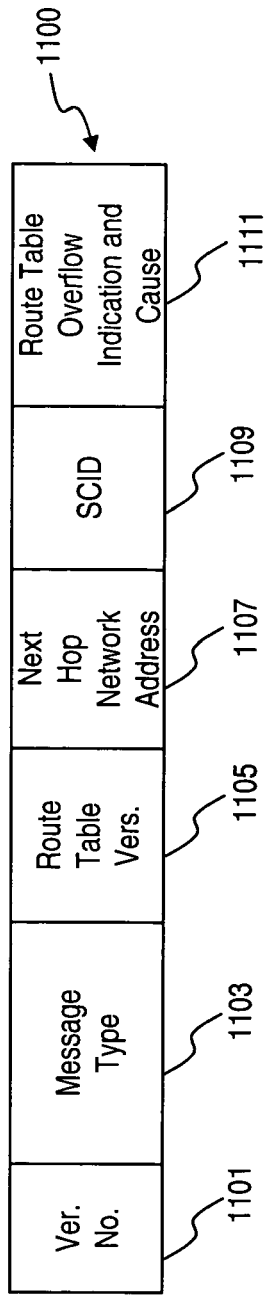
FIG. 11 is a diagram of a format of a Heartbeat message used in an Internal Satellite Routing Protocol, according to an embodiment of the present invention.

FIG. 11 is a diagram of a format of a Heartbeat message used in a Satellite Routing Protocol, according to an embodiment of the present invention. A ST sends a Heartbeat message 1100 at configurable intervals to notify the route server 215 of the route table version number of the ISRP route table. The Heartbeat message 1100, in an exemplary embodiment, includes an ISRP Version Number field 1101, an ISRP Message Type field 1103 (Heartbeat), an ISRP Route Table Version field 1105, a Next Hop Network Address field 1107 (e.g., IPv4 or IPv6), a Satellite Context ID (SCID) field 1109, and a Route Table Overflow Indication and Overflow Cause field 1111.

STs maintain route tables, which include default and static routes that are configured, as well as routes learned by way of dynamic routing protocols. These mechanisms may cause the route table to overflow; accordingly an overflow indicator (i.e., Overflow Indication and Overflow Cause field 1111) is provided. Overflows can be caused, for example, by the terrestrial routing protocol (RIP or OSPF), ISRP or Satellite Redirect adding route entries beyond the total size allowable by the ST port. The Overflow Indication and Overflow Cause field 1111 specifies one of these causes.

Figure 12:
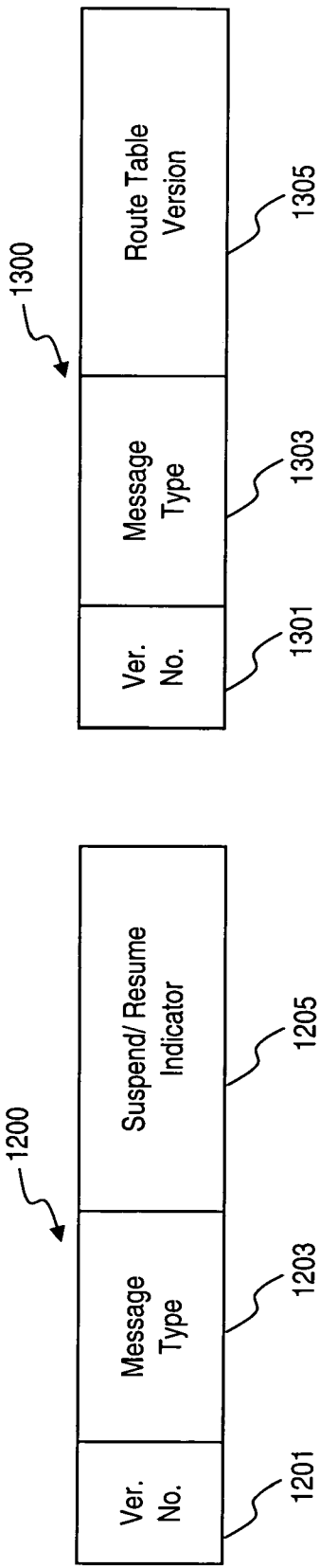
FIG. 12 is a diagram of a format of a Suspend message used in an Internal Satellite Routing Protocol, according to an embodiment of the present invention.

FIG. 12 is a diagram of a format of a Suspend message used in a Satellite Routing Protocol, according to an embodiment of the present invention. The route server 215 sends a Suspend message 1200 to the remote STs; and the remote STs are not to send any ISRP messages to the route server 215. The Suspend message 1200 includes an ISRP Version Number field 1201, an ISRP Message Type field 1203 (Suspend), and a Suspend/Resume Indicator field 1205. The route server 215 would follow the Suspend message 1200 with an ISRP Rejoin message, as shown below in FIG. 13.

Figure 13:
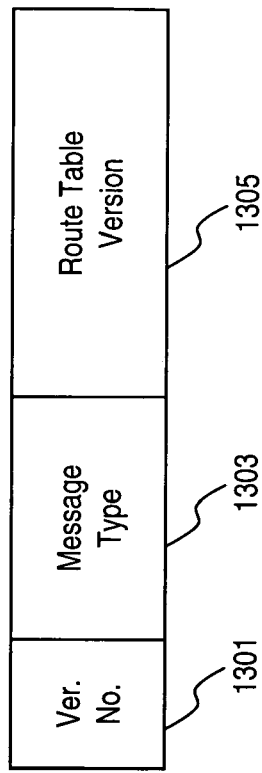
FIG. 13 is a diagram of a format of a Rejoin message used in an Internal Satellite Routing Protocol, according to an embodiment of the present invention.

FIG. 13 is a diagram of a format of a Rejoin message used in a Satellite Routing Protocol, according to an embodiment of the present invention. The route server 215 sends a Rejoin message 1300 as an empty Table Broadcast to instruct the receiving STs to clear out routes learned from the satellite link and to send terrestrial routes using the ISRP Route Change Update message. The Rejoin message 1300, in an exemplary embodiment, includes an ISRP Version Number field 1301, an ISRP Message Type field 1303 (Rejoin), and an ISRP Route Table Version field 1305 (e.g., INITIAL_ROUTE_TABLE)

Figure 14:
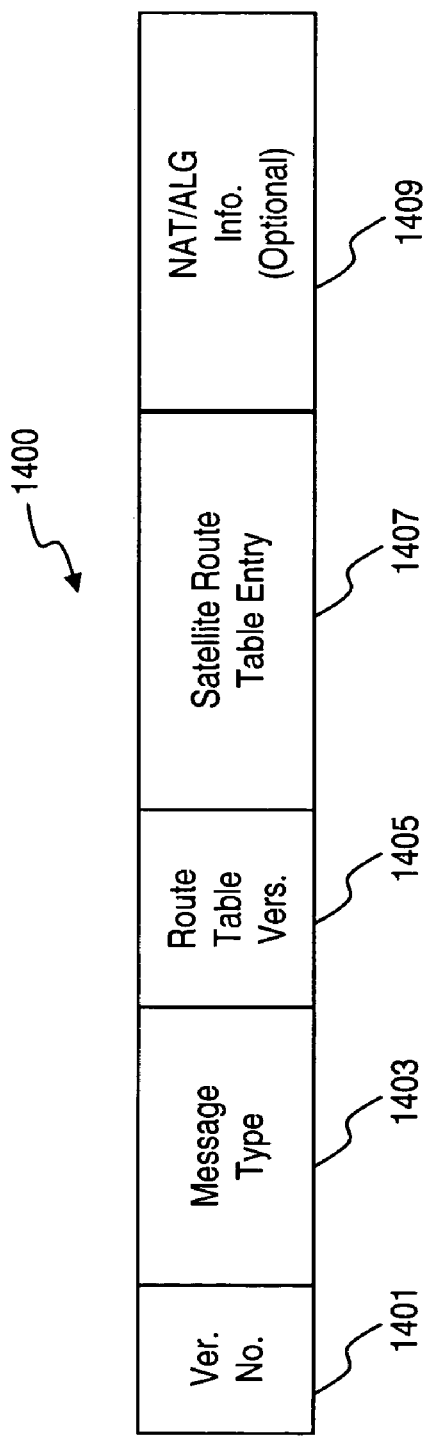
FIG. 14 is a diagram of a format of a Satellite Redirect message used in an Internal Satellite Routing Protocol, according to an embodiment of the present invention.

FIG. 14 is a diagram of a format of a Satellite Redirect message used in a Satellite Routing Protocol, according to an embodiment of the present invention. ISRP Satellite Redirect is a mechanism of unicasting routing information from the access gateway and route server 215 to the customer's ST. The access gateway and route server 215 know the allowable routes that are available via the satellite network. The access gateway and route server 215 learn these routes by way of static configuration and ISRP Change Update messages.

A customer may configure the remote STs default route to specify the access gateway as the next hop. When a ST receives an IP packet for which the ST does not have an explicit Route Table entry, the ST forwards the packet to the access gateway. If the access gateway does not have a route entry, then the gateway sends an ICMP Host Unreachable message back towards the source of the IP packet. However, if the access gateway finds a route entry, then the gateway forwards the packet. If the next hop IP address is associated with the satellite interface, then the access gateway knows that the source ST could send follow-on packets directly to the destination ST. The access gateway determines the IP address of the source ST by performing another route table lookup on the source IP address of the IP packet.

The access gateway sends an ISRP Satellite Redirect message 1400 to the source ST. The Satellite Redirect message 1400 includes an ISRP Version Number field 1401, an ISRP Message Type field 1403 (Satellite Redirect), an ISRP Route Table Version field 1405, and a Satellite Route Table entry field 1407. The remote ST inserts the Satellite Route Table entry 1407 into its route table and sets the timer for the entry. All subsequent packets to the same destination IP address are sent over the satellite via a single hop. It is noted that the format of Satellite Redirect message 1400 may alternatively provide an optional field 1409 for NAT/ALG information. If the IP packet requires an ALG operation, then the access gateway may drop the packet.

Figure 15:
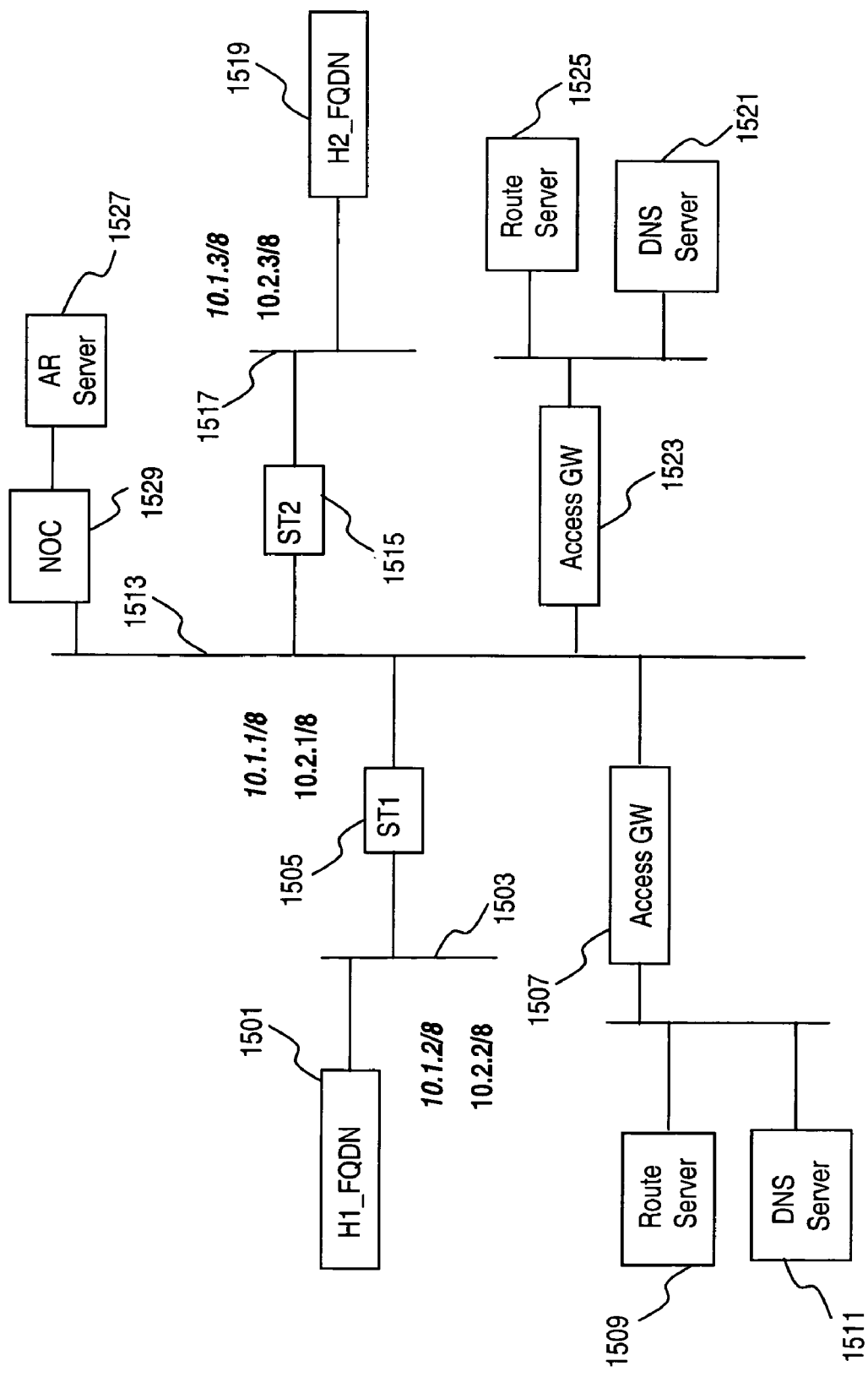
FIG. 15 is a diagram of an addressing approach for supporting communication between two private addressing domains, according to an embodiment of the present invention.

FIG. 15 is a diagram of an addressing approach for supporting communication between two private addressing domains, according to an embodiment of the present invention. In this example, a host 1501 has connectivity to a data network 1503, to which a satellite terminal (ST) 1505, an access gateway 1507, a route server 1509, and a DNS server 1511 are attached. In an exemplary embodiment, the network 1503 is a local area network (LAN). The network 1513 constitutes a private addressing domain and includes the ST 1505 for access to a wide area network (WAN) 1513, which in this example is a satellite network. Alternatively, the network 1503 may itself be a WAN (instead of a LAN), whereby the DNS server 1511 is connected to the network 1503 via an ST (not shown); this configuration permits an enterprise to locate the DNS server 1511 anywhere in its network.

As mentioned previously, every host in a network needs a mechanism to convert host names (i.e., symbolic addresses) to host addresses (i.e., numeric addresses) and vice-versa. DNS provides such a mechanism. The Internet DNS provides this capability by creating a distributed database that is used primarily for the translation between host names and IP addresses. This distributed database allows local control of the segments of the database, while making the overall database available across the entire network through a client-server scheme. Programs, known as "name servers" constitute the server half of the DNS client-server mechanism, while the client-side is referred to as "resolvers."

One implementation of DNS is the Berkeley Internet Name Domain (BIND). In BIND, the resolver is just a set of library routines that are linked into programs (such as the File Transfer Protocol (ftp)). The resolver has the capability to generate a query, send the query, and wait for an answer to the query; further, if necessary, the resolver may resend the query if no response is received. In general, the burden of finding an answer to the query lies largely with the DNS server 1511, 1521.

A second private addressing domain is supported by another ST 1515. The ST 1515 is coupled to a network 1517 that includes a host 1519, a DNS server 1521, an access gateway 1523, and a route server 1525. Each of the STs 1505, 1515, according to an exemplary embodiment, maintains an Address Resolution (AR) cache on its satellite interface for resolving the next-hop network address (IPv4 or IPv6) and Satellite Context ID (SCID) to the Satellite Destination (link layer) Address. Accordingly, the STs 1505, 1515 support ARP (Address Resolution Protocol), as detailed in IETF RFC 826, for resolving IPv4 addresses and ND (Neighbor Discovery), as detailed in IETF RFC 2461, for resolving IPv6 addresses. The NOC 1529 is configured to deny Satellite ARP Requests to hosts which are resolving to IP addresses of STs which have been suspended.

The STs 1505, 1515 maintain AR caches 144 on their terrestrial interfaces for resolving the next-hop network address (IPv4 or IPv6) to, for example, an Ethernet MAC (Medium Access Control) Address. The ST 1505, 1515 supports the use of configured (static) AR entries for its satellite interface. Upon receiving RIP and OSPF messages at the LAN interface, the ST 1505, 1515 translates these routing protocols into the Internal Satellite Routing Protocol (ISRP). Correspondingly, upon receiving ISRP messages at its satellite interface, the ST 1505, 1515 translates this protocol into RIP and OSPF messages. If the ST 1505, 1515 is suspended and is configured to use a local routing protocol (i.e., RIP or OSPF), the ST 1505, 1515 reports that the subnets that are previously reachable over the satellite air interface are no longer reachable. Also, if a previously suspended ST 1505, 1515 is placed into a state where it is no longer suspended and is configured to use a local routing protocol (i.e., RIP or OSPF), the ST 1505, 1515 then report the subnets that are currently reachable over the satellite air interface. The ST 1505, 1515, if running dynamic routing protocols (RIP or OSPF) on its terrestrial ports, would update its route table and broadcast these changes appropriately on its terrestrial interface when its satellite interface is not operational.

For the purposes of explanation, the hosts 1501, 1519 are assumed to be owned by two different customers, C1 and C2. It is also assumed that each of the hosts 1501, 1519 (i.e., H1 and H2) is associated with a Fully Qualified Domain Name (FQDN); e.g., the host 1501 has the name "H1_FQDN" and the host 1519 has the name "H2_FQDN." The FQDN is pre-configured separately in each customer's DNS Server 1511, 1521, along with the appropriate private IP address associated with the customer's subnet structure.

As previously discussed, a route server 1509, 1525 provides a central mechanism to collect all route changes and coordinates the distribution of these changes to the participating routers. The route server 1509 is more fully described below. It is recognized that the route server 1525 possesses similar functionalities.

As explained with respect to FIG. 4, the route server 1509 initializes by deleting all dynamic routes and sending an ISRP Rejoin message to all remote STs (in this example, ST 1505) configured as part of the route server 1509. This cause the ST 1505 to send ISRP Route Change Update messages representing the network connectivity the ST 1505 has at its terrestrial interface. When the route server 1509 receives ISRP Route Change Update messages, the route server 1509 rebuilds the route table for the access gateway 1507. The route server 1509 waits a configurable period of time or until it has received an update from each ST 1505 (whichever is less) before distributing the first ISRP Route Table Broadcast message.

As the route server 1509 is receiving ISRP Route Change Update messages, the route server 1509 verifies the elements of the message. Particularly, the route server 1509 checks the Route Table Version in the message prior to processing the route change update entries. For each entry, the route server 1509 evaluates the change in the cost metric of the specified network address. If the network address of the addressing domain does not exist in the route table, then the entry is added (unless, for example, the cost indicated is "infinity"). By way of example, this "infinity" cost is represented in the manner employed by RIP (a value of 16). If the network address exists in the route table and the cost metric is less than an existing route to the same network address and network mask, then the route server 1509 replaces the existing route with the new route. If the network address exists in the route table with the same next hop IP address, but the cost indicated is infinity, then the existing route is indicated as infinity and a timer is started to timeout the route.

The mechanism of "timing out" routes that reach infinity has two parts. Within the ISRP protocol, the cost metric value of infinity is assigned. If the cost metric of a route reaches infinity (for example, by way of a lost link or otherwise), the route entry is updated with the infinity cost metric and a timer is set. If the timer expires, the route entry is removed from the route table. Another route may be discovered to provide connectivity to the subnet originally specified as the destination network in the route or connectivity will be re-established prior to the timer expiring.

As the route server 1509 receives the ISRP Route Change Update message from the ST 1505, the route server 1509 sends out an ISRP Route Change Acknowledgement message after it has validated the incoming message. The route server 1509 unicasts this acknowledgement to the ST 1505.

Under certain circumstances, such as startup or switchover of the access gateway 1507, the amount of ISRP Route Change Update messages may be "high." In such instances, an ISRP Route Table Broadcast message is sent to convey the changes in terrestrial connectivity (or cost metrics). A configurable threshold could be set at the route server 1509 associated with the rate in which route changes occur. If the threshold is exceeded, then the route server 1509 uses the ISRP Route Table Broadcast message. Each time the route server 1509 uses this message, the version number of the route table is incremented.

In "steady-state" conditions, when the route change threshold is not exceeded, the route server 1509 sends ISRP Route table Update messages at configurable intervals. If the route server 1509 does not have any route changes in the interval, then no messages are sent. The purpose of the ISRP Route table Update message is to only send the changes in the route table and conserve bandwidth. The route server 1509 specifies the version number of the route table.

The ISRP Heartbeat message is used to verify satellite link connectivity of the STs 1505, 1515. When the route server 1509 receives the ISRP Heartbeat message from the ST 1505, the route server 1509 can check the route table version to verify that the ST 1505 is using the correct routing information. The route server 1509 is configured with a timer, whereby the route server 1509 should have received either an ISRP Heartbeat message or an ISRP Route Change Update message from the ST 1505. If the route server 1509 receives either of these messages within the configured time interval, then the timer is reset. Otherwise, the route server 1509 assumes there is no longer satellite link connectivity with that ST 1505. The route server 1509 identifies all route entries that have this ST 1505 listed as the "next hop" and sets their cost metric to infinity. These route entries are conveyed to the other STs (e.g., ST 1515) using the various mechanisms discussed earlier. The route server 1509 uses the infinity timeout mechanism to remove the route entry.

If the ST 1505 sends a Heartbeat message with the wrong route table version, then the ISRP Route Table Broadcast message is sent. The route server 1509 is configured with a threshold (indicating the number of Heartbeat messages that have been received with the wrong route table version in some period of time) to determine if the ISRP Route Table Broadcast message is sent using unicast or multicast. The threshold would determine the most efficient method of updating the STs with the correct route table.

If the ST 1505 sends a Heartbeat message with the route table version set to INITIAL_ROUTE_TABLE, then the route server 1509 identifies all route entries that list this ST 1505 as the Next Hop IP Address and sets the cost of those entries to infinity; such is the case, for example, when an ST reboots between ISRP Heartbeat intervals.

Three elements in the behavior of the STs 1505, 1515 as it relates to the ISRP are considered. These elements concern how an ST behaves as it sends and receives ISRP messages over IP, how the ST translates between RIP and ISRP messaging, and how the ST translates between OSPF and ISRP messages. The ST 1515 receives routing information learned terrestrially by way of RIPv1, RIPv2, or OSPFv2 and learned via the satellite link from ISRP. The STs 1505, 1515 are configured with the IP address of their respective ISRP route servers 1509, 1525 and with the Satellite Context IDs that they will use to report routing information through ISRP.

The ST 1505 initializes its route table by removing all entries across the satellite link and sends an ISRP Route Change Update message with the route table version set to INTIAL_ROUTE_TABLE. The ISRP Route Change Update message is populated by route entries learned from the ST's terrestrial routing protocol (RIP or OSPF). Reception of this type of Change Update message signals to the route server 1509 that this ST 1505 needs to receive an ISRP Route Table Broadcast message. The ST 1505, upon sending this Change Update message, resets its ISRP Heartbeat message timer.

Each time the ST 1505 sends either an ISRP Route Change Update message or an ISRP Heartbeat message, the ST 1505 resets the Heartbeat message timer.

Whenever the ST's terrestrial routing protocol provides a route change, (e.g., a new route or a change to the cost metric of an existing route), the ST 1505 sends an ISRP Route Change Update message to the route server 1509. The ST 1505 is configured with a Retry Timer, such that if the ST 1505 does not receive an ISRP Route Change Acknowledgement message, then the timer triggers the ST 1505 to re-send the ISRP Route Change Update message. If more changes in the terrestrial routes occur during the retry interval, the ST 1505 includes these changes in the resent ISRP Route Change Update message.

If the ST 1505 receives an ISRP Route Table Broadcast message, the ST 1505 identifies all route entries in the message whose next hop is reached by way of the satellite link and adds a configured value (SATELLITE_COST) to the cost metric of the route. The ST 1505 then imports all the route entries in the ISRP Route Table Broadcast message into the terrestrial protocol (RIP or OSPF) so that the protocol can make a local determination of best path.

The rules for determining the best path are as follows. If the ISRP Route Table Broadcast message has a route entry for which there is no corresponding match (a new subnet address and subnet mask) in the route table as maintained by the terrestrial protocol, then the route entry is added. If the ISRP Route Table Broadcast message has a route entry whose next hop is across the satellite link, and there is a corresponding entry in the route table with matching subnet address, subnet mask, Satellite Context ID, and next hop IP address, then the existing entry is replaced. However, if the Satellite Context ID and/or next hop IP address is different, then the existing entry is replaced if cost metric of the new route entry is lower.

Prior to the ST's terrestrial routing protocol advertising the routes that will be reached by way of the ST 1505, the ST 1505 aggregates these routes into the fewest number of entries as possible. In the same manner, when an ST 1505 receives an ISRP Route table Update message, the ST 1505 is to identify all route entries in the message whose next hop is reached by way of the satellite link and add a configured value (SATELLITE_COST) to the cost metric of the route. The ST 1505 is to provide the same treatment described above for importing these new route entries into the route table and determining best path.

After sending the ISRP Heartbeat message, the ST 1505 resets the ISRP Heartbeat message timer. The configured interval for sending ISRP Heartbeat messages is described as follows. The ST 1505 selects a random number between Y−X and Y+X for sending ISRP Heartbeat messages, wherein the average interval is Y and the window is X. This reduces the probability of overload at the route server 1509 due to a synchronization phenomenon often found in traditional networks. This synchronization phenomenon is described in "Routing in the Internet" by Christian Huitema ($2^{nd}$ edition).

The ISRP Heartbeat message also has an indication of a route table overflow condition at the ST as well as the cause of the overflow. The STs 1505, 1515 are sized for the route tables, which include default and static routes that are configured, as well as routes learned by way of dynamic routing protocols. These different routing mechanisms may cause sized route tables to overflow; so an overflow indicator is provided. Overflows can be caused by the terrestrial routing protocol (RIP or OSPF), ISRP, or Satellite Redirect adding route entries beyond the total size allowable by the ST.

When the ST 1505 receives an ISRP Rejoin message, the ST 1505 employs a similar mechanism as it uses for the ISRP Heartbeat message. After clearing the route table and determining the terrestrial routes to which it provides reachability, the ST 1505 sends an ISRP Change Update message. The ST 1505 is configured with a parameter Z (an integer), which is used to determine when to send the initial ISRP Change Update message. The ST 1505 selects a random number between 0 and Z to serve as a delay timer for sending the initial ISRP Change Update message. This mechanism minimizes network congestion at the route server 1509.

When so configured, the ST 1505 supports and terminates either RIPv1 or RIPv2 (for IPv4) and RIPng (for IPv6) at its terrestrial interface. The first case to consider is the translation of route changes from RIP to ISRP. The ST 1505 receives either periodic or triggered RIP Response messages. RIPv1 Response messages contain an IPv4 address and a metric. The RIPv2 Response messages contain an IPv4 address, a subnet mask, the IP address of the next hop router, and a metric. The ST 1505 is configured with a subnet mask for its terrestrial interface. For RIPv1, the ST 1505 compares the route and configured subnet mask of the terrestrial interface to determine the network ID.

The processing of RIP Response messages entails the ST 1505 generating ISRP Route Change Update messages. Specifically, if the route entry (from a received RIP Response message) is not present in the ST's route table, the route entry is added. Similarly, the route entry is inserted if the route entry is present but the cost metric of the route entry in the RIP Response message and is not infinity. This addition initializes the metric to the received value and updates the next hop router as the sender of the message, before a timer for that entry is started.

If the entry is present with a larger metric, the metric and next router fields are updated. In addition, the timer for the particular entry is restarted. If the entry is present and the next router is the sender of the response message, the metric is updated if the entry differs from the stored value, and the timer is restarted. If the timer of the entry expires prior to being refreshed, the metric is set to infinity and the entry begins timing out.

The ST 1505 is configured with a timer interval to accumulate the number of route entries that are learned from RIP and placed into the ISRP Route Change Update message. When the ST 1505 populates the ISRP Route Change Update message with route entries learned from RIP, the ST 1505 inserts its IP address that is associated with the satellite interface for the next hop routing field.

The second case to consider is the translation of route changes from ISRP to RIP. If the ST 1505 is configured to provide periodic RIP Response messages, then the ST 1505 creates RIP Response messages for every route entry in its route table. If the ST 1505 is configured to provide triggered RIP Response messages, then the ST 1505 generates Response messages when it receives either an ISRP Route Table Broadcast message or an ISRP Route table Update message which cause route entries to be imported or updated. When the ST 1505 advertises the routes learned from ISRP using RIP, the ST 1505 substitutes the ST's terrestrial interface IP address for the next hop routing field.

The translation between OSPF and ISRP message is supported by the ST 1505. The ST 1505 is configured with OSPF such that the ST 1505 sends and receives Link State Advertisements (LSA) as the ST 1505 participates in the various OSPF protocols. OSPF is composed of several protocols whereby several packet formats are specified: Hello, Database Description, Link State Request, Link State Update, Link State Acknowledgement, Link State Advertisement, Router Links Advertisement, Network Link Advertisement, Summary Link Advertisement, and Autonomous System (AS) External Link Advertisement.

The ST 1505, using, for example, these LSAs and Dijkstra's algorithm, determines route table entries with associated cost metrics. Whenever the OSPF route table changes, the ST 1505 triggers ISRP Route Change Update messages. When the ST 1505 supporting the various OSPF protocols send LSAs onto its terrestrial interface, the ST 1505 generate these LSAs from the ISRP route table.

According to one embodiment of the present invention, four different types of LSAs are supported: Router Link Advertisements, Network Link Advertisements, Summary Link Advertisements, and Autonomous System Link Advertisements. The types of LSAs that the ST generates depend on the OSPF hierarchical configuration of the ST. IP routers that support OSPF may be configured to support various levels of routing hierarchy as listed below: OSPF level 1 area routers, OSPF area border routers, and OSPF autonomous system (AS) border routers.

The term "area" in OSPF specifies a set of routers that freely exchange LSAs with no constraints. The OSPF defines a "backbone area" as a set of routers whereby packets travel through it when going from one area to another. Within an autonomous system (AS), area border routers report costs to networks within the autonomous system as well as the "cost to" AS border routers. AS border routers report cost from themselves to the networks outside the autonomous system. OSPF supports the notion of a "stub area." For stub areas connected to an AS border router, link state information generated by the AS border router is not flooded into the area. This is a mechanism for conserving memory and bandwidth at the expense of less optimal routes.

As mentioned, the satellite system supports the ability of the end hosts and STs to be part of subnets with private addressing. For instance, the IETF has set aside the following address ranges for use in private networks: 10.0.0.0/24, 172.16.0.0/20, and 192.168.0.0/16; details of these address ranges are provided in RFCs 1597 and 1918—both of which are incorporated herein by reference in their entireties.

In support of the above functionality, an appropriate signaling mechanism is performed within the network elements to allow communication to proceed in a single satellite hop. The mechanism involves network management procedures among the network service provide and customers—this may be in form of a partnership, for example. In addition to the network management preconditions, a network signaling protocol is utilized to distribute the necessary state information to the STs. It is noted that this mechanism is executed for customers that use private addressing for their STs or their host subnets.

The process for establishing the network management preconditions is now described. In this example, C1 and C2 want to form a communication partnership with each other. C1 chooses an IP address within its own address space that will be associated with the domain name H2_FQDN; for the explanatory purposes, this IP address is 10.1.3.1. An entry is configured into C1's DNS server 1511: H2_FQDN←→10.1.3.1.

Next, C2 assigns a set of IP addresses within its own address space, one of which is associated with C1's address 10.1.3.1. It is assumed this IP address is 10.2.3.1. C2 uses this address to perform a network address translation to/from 10.1.3.1. C2's DNS Server 1521 is configured as follows: H2_FQDN←→10.2.3.1. A NAT entry in C2's access gateway 1523 is as follows: 10.1.3.1←→10.2.3.1. This NAT entry is distributed by the access gateway 1507 of C1.

C1's access gateway 1507 has the following the route entry: 10.1.3/8→10.1.1.2 (private IP address of ST 1505 in C1's context). An Address Resolution (AR) Server 1527 at the NOC 1529 is configured with 10.1.1.2→ST1 SAT MAC (AR cache entry) for the appropriate community of interest (COI) associated with C1.

C2 assigns a set of IP addresses from its own address space to use to map to IP addresses from hosts in C1. In this example, H1_FQDN has an IP address of 10.1.2.1; and C2 uses IP address 10.2.2.1 to NAT to/from 10.1.2.1. This set of C2 IP addresses is configured into C1's access gateway 1507 and distributed to ST 1505. C2 also is configured with a route entry of: 10.2.2/8→10.2.1.1 (private IP address of ST 1505 in C2's context). Thus, the AR Server 1527 is configured with 10.2.1.1→ST1 SAT MAC (AR cache entry) for the appropriate COI associated with C2. At this point, the system of FIG. 15 is capable of establishing communication between the different private addressing domains of network 1503 and network 1517, as described below in FIGS. 16*a* and 16*b*.

Figure 16A:
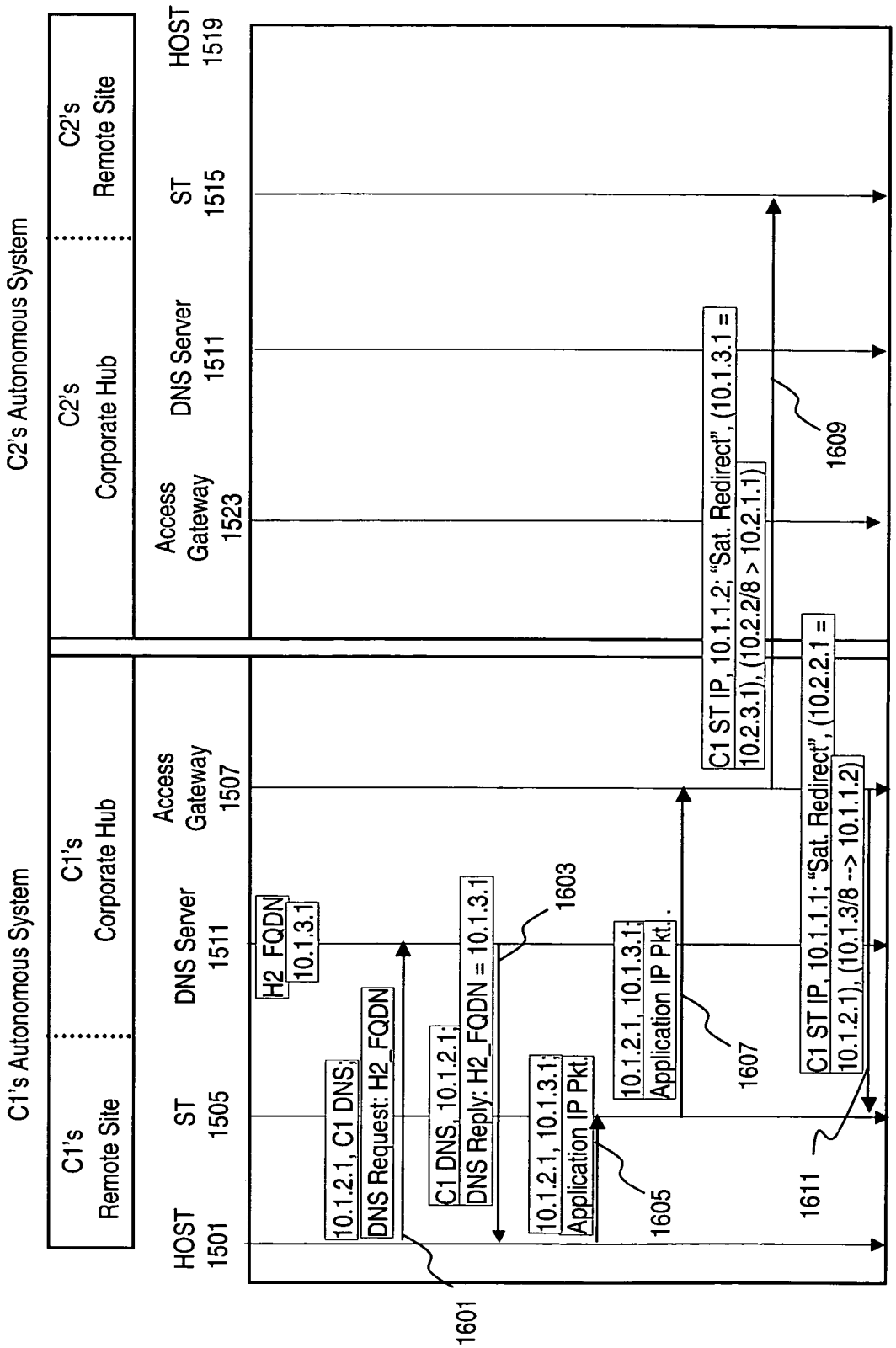
FIGS. 16a and 16b are diagrams of processes associated with establishing communication between the two private addressing domains of the system of FIG. 15.
Figure 16B:
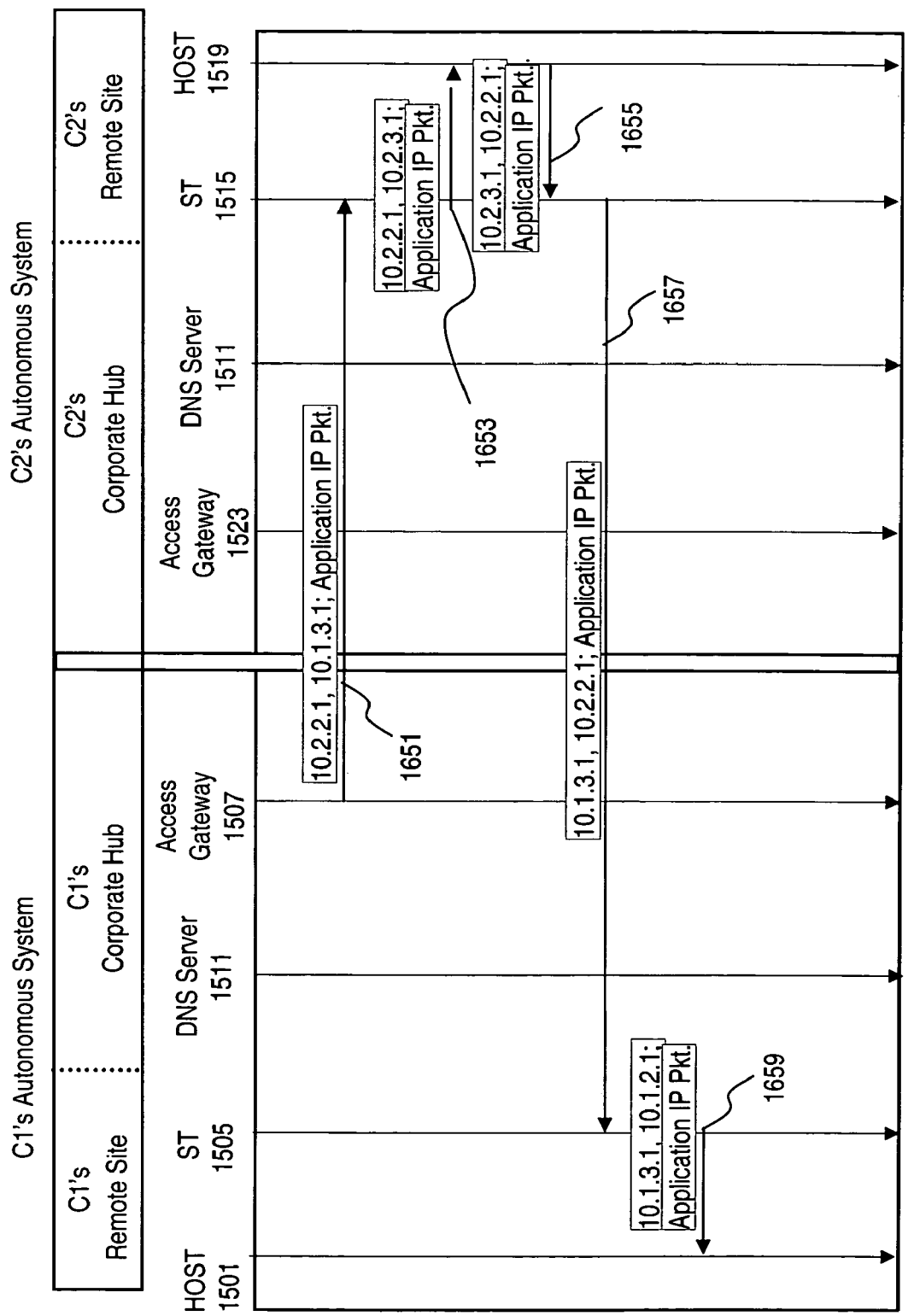

FIGS. 16*a* and 16*b* are diagrams of processes associated with establishing communication between the two private addressing domains of the system of FIG. 15. In particular, the diagrams illustrate the network signaling to allow for follow-on communication to occur one-hop over the satellite network between C1's host 1501 and C2's host 1519. In this example, an application running on host 1501 (i.e., H1_FQDN) accepts a URL from the user and submits a DNS Request, as in step 1601, for H2_FQDN (i.e., host 1519). The source IP address is 10.1.2.1, which is within the addressing domain of C1. The destination IP address is that of C1's DNS server 1511. The packet may pass through ST 1505 and another ST (not shown), assuming this other ST is serving the subnet DNS server 1511. The DNS server 1511 is preconfigured with the IP address for its own domain for H2_FQDN. Accordingly, this IP address (10.1.3.1) is returned back to H1_FQDN in a DNS Reply message, per step 1603.

Next, the application on the host 1501 sends an application packet (which is converted into one or more IP packets) with a destination IP address of 10.1.3.1 (i.e., host 1519). The host 1501 sends this packet to ST 1505 (because the ST 1505 serves as the default router for the host 1501), per step 1605. The ST 1505 examines its route table for an entry that matches the destination address of 10.1.3.1 (i.e., host 1519). Because no entry is found, the ST 1505 selects the default route entry which has the next hop IP address of C1's access gateway 1507. The application IP packet is sent, as in step 1607, to the access gateway 1507. The diagram shows IP source and destination addresses in C1's network addressing domain, 10.1.2.1 (i.e., host 1501) and 10.1.3.1 (i.e., host 1519), respectively, along with the IP payload that contains the application data.

C1's access gateway 1507 performs a route table lookup on the destination IP address 10.1.3.1 (i.e., host 1519) and detects that there are "special" additional elements associated with this entry. The access gateway 1507 is configured with a "NAT entry" that gives an equivalent address to 10.1.3.1 (i.e., host 1519) in C2's address space, namely 10.2.3.1 (i.e., host 1519). Additionally, the Gateway 1507 has a Route Table entry for 10.2.2/8, specifying 10.2.1.1

(i.e., ST 1505). C1's access gateway 1507 sends, as in step 1609, a special ISRP Satellite Redirect message with this information to the next hop ST associated with the route entry for 10.1.3.1 (i.e., host 1519), which is 10.1.1.2 (i.e., ST 1515).

Additionally, C1's access gateway 1507 detects that ST 1505 has sent the IP application packet to the hub ST instead of to ST 1515 and determines that "direct" route entry along with a NAT entry is needed. The access gateway 1507 is able to determine that the communication is between H1 and H2, such that ST 1505 needs a NAT entry for 10.1.2.1 from C2's address space, namely 10.2.2.1. Additionally, the access gateway 1507 has a Route Table entry for 10.1.3/8, specifying 10.1.1.2 (i.e., ST 1515). In step 1611, the access gateway 1507 sends a special ISRP Satellite Redirect message to the ST 1505 that contains this NAT entry along with the Route Table entry for reaching the host 1519 (i.e., H2_FQDN).

As seen in FIG. 16b, C1's access gateway 1507 sends the application IP packet onto the next hop ST, namely ST 1515, and changes the source IP address of the host 1501 from 10.1.2.1 to 10.2.2.1 so as to be part of C2's addressing domain, per step 1651. The ST 1515 performs a NAT function on the destination IP address, converting the C1 addressing domain to that of C2. The ST 1515 then forwards, as in step 1653, the IP packet to the host 1519 (i.e., H2_FQDN). In step 1655, the application of the host 1519 responds by sending another application packet (which becomes an IP packet with the destination IP address of 10.2.2.1 (i.e., host 1501)) destined for the host 1501 (i.e., H1_FQDN) to the ST 1515. In turn, the ST 1515 performs a NAT function on the source IP address so as to be part of C1's addressing domain and forwards the packet to the ST 1505, per step 1657. Next, the ST 1505 performs a NAT function on the destination IP address to convert to C1's addressing domain, accordingly and forwards the IP packet to host 1501, per step 1659.

At this point, ST 1505 and ST 1515 are properly configured with the necessary NAT entries, route table entries, and AR cache entries to allow direct communication between the host 1501 and the host 1519 with one satellite hop and, therefore, have established mesh connectivity for overlapping private addressing domains.

In the system of FIG. 15, a number of error conditions may arise; for example, a packet may get lost during the signaling setup of FIGS. 16a and 16b. During steps 1601 and 1603, if either the DNS Request or the Reply is lost, the application of the host 1501 will timeout and retry. If the Application IP packet is lost during steps 1605 and 1607, then the application's mechanisms control how the loss is handled. For example, if the application is TCP, then TCP will timeout and resend. If the application is UDP, then another packet from the same flow (same source and destination IP address) will follow. During step 1609, if the access gateway 1507 does not have a route entry for the destination address, then the access gateway 1507 should send a "Destination Unreachable" ICMP packet back toward the source IP address. If the ISRP Satellite Redirect packet is dropped before the packet gets the ST 1515, then at steps 1613 and 1615 when ST 1515 receives the application IP packet, the ST 1515 will forward the packet to C2's access gateway 1523 because of its default route.

It is instructive to discuss Applications Layer Gateway functions. Applications that imbed network layer addresses are affected by NAT—unless the NAT device supports corresponding ALGs. Exemplary ALGs are detailed in IETF RFC 3027, which is incorporated herein by reference in its entirety. ALGs that are required by NAT include the following: File Transfer Protocol (FTP), Resource Reservation Protocol (RSVP), Domain Name Service (DNS), Simple Mail Transfer Protocol (SMTP), Session Initiation Protocol (SIP), RealAudio, ITU H.323, and Simple Network Management Protocol (SNMP). The STs 1505, 1515 performing NAT on the satellite interface also support ALGs for any of the above protocols that have signaling traffic that traverses the satellite network.

In this scenario, an ALG may be run at the access gateway 1507, 1523 on the first IP packet of the extranet signaling session. The access gateway 1507, 1523 passes state information of the ALG to the ST 1505, 1515 that initiated communications, such that the access gateway 1507, 1523 may resume the ALG for the subsequent IP packets that follow. This state information, in an exemplary embodiment, is passed in a Satellite Redirect Message along with the routing and NAT information.

It is also possible for the access gateway 1507, 1523 to drop the IP packet if an ALG is required, thereby removing the complexity of having to pass state information of the ALG from the access gateway 1507, 1523 to the ST 1505, 1515.

As evident from the above discussion, the customers, C1 and C2, may assign private subnet addresses for their terrestrial links, in which the subnet addresses are non-overlapping. Each customer, thus, maintains the appropriate DNS entry for each host 1501, 1519 in the respective DNS server 1511, 1521; the DNS entry is a private entry for that customer alone. The access gateway 1507, 1523 is configured with the NAT information; accordingly, the assignment of IP addresses to corresponding hosts 1501, 1519 is static.

With respect to implementation, the system of FIG. 15 may encounter the issues: Reporting of Route table Overflow Condition, Handling of IPv4 TTL and IPv6 Hop Limit Fields, and ST (UP) Route Table Structure. In particular, the manner in which route entries can be assigned to the terrestrial interface and the satellite link impacts management of the route table. A consideration is the fact that the route entries are maintained by numerous different routing mechanisms (e.g., static routes, default routes, ISRP, RIP, OSPF, and Satellite Redirect).

ISRP specifies a mechanism in which the ST 1505, 1515 can report to the route server 1509, 1525 conditions in which the remote's route table overflows and the cause of the overflow. The ST 1505, 1515 monitors the overall size of its route tables continually and reports overflow conditions. The ST 1505, 1515 maintains statistics regarding overflow indications that are received by way of ISRP and forwards these statistics to the NOC 1529.

As regards the handling of IPv4 TTL and IPv6 Hop Limit Fields, when a router receives an IP packet at one of its ports, the router decrements either the TTL or Hop Limit field and determines whether the IP packet has reached its packet "lifespan." The originating host initializes the TTL or Hop Limit field. When the field reaches zero, the IP packet is dropped. Whenever a router discards a datagram because its hop count has reached zero, the router sends an ICMP time exceeded message back to the IP source address. In the system of FIG. 15, the STs 1505, 1515 are configured with router functionalities.

When the ST 1505, 1515 receives an IP packet at its terrestrial interface, the ST 1505, 1515 will either successfully resolve the destination IP address of the packet or will discard the packet. If the ST 1505, 1515 finds a route entry which identifies that the next hop IP address is associated with its Ethernet port, then the ST 1505, 1515 subtracts a value of one from the TTL or Hop Limit field and, if zero, discards the IP packet. If the ST 1505, 1515 finds a route entry which identifies that the next hop ST is reached via the satellite link, then the ST 1505, 1515 subtracts (1+satellite weight) from the TTL or Hop Limit field. The satellite weight is a configurable parameter that may be obtained from the NOC 1529. If the value of the TTL or Hop Limit field becomes zero or negative, then the ST 1505, 1515 discards the IP packet. When the ST 1505, 1515 discards the IP packet because of the Hop Limit or TTL field is zero or negative, the ST 1505, 1515 sends an ICMP time exceeded message back to the IP source address, according to IETF RFC 2463 and IETF RFC 1256 (both of which are incorporated herein by reference in their entireties).

Figure 17:
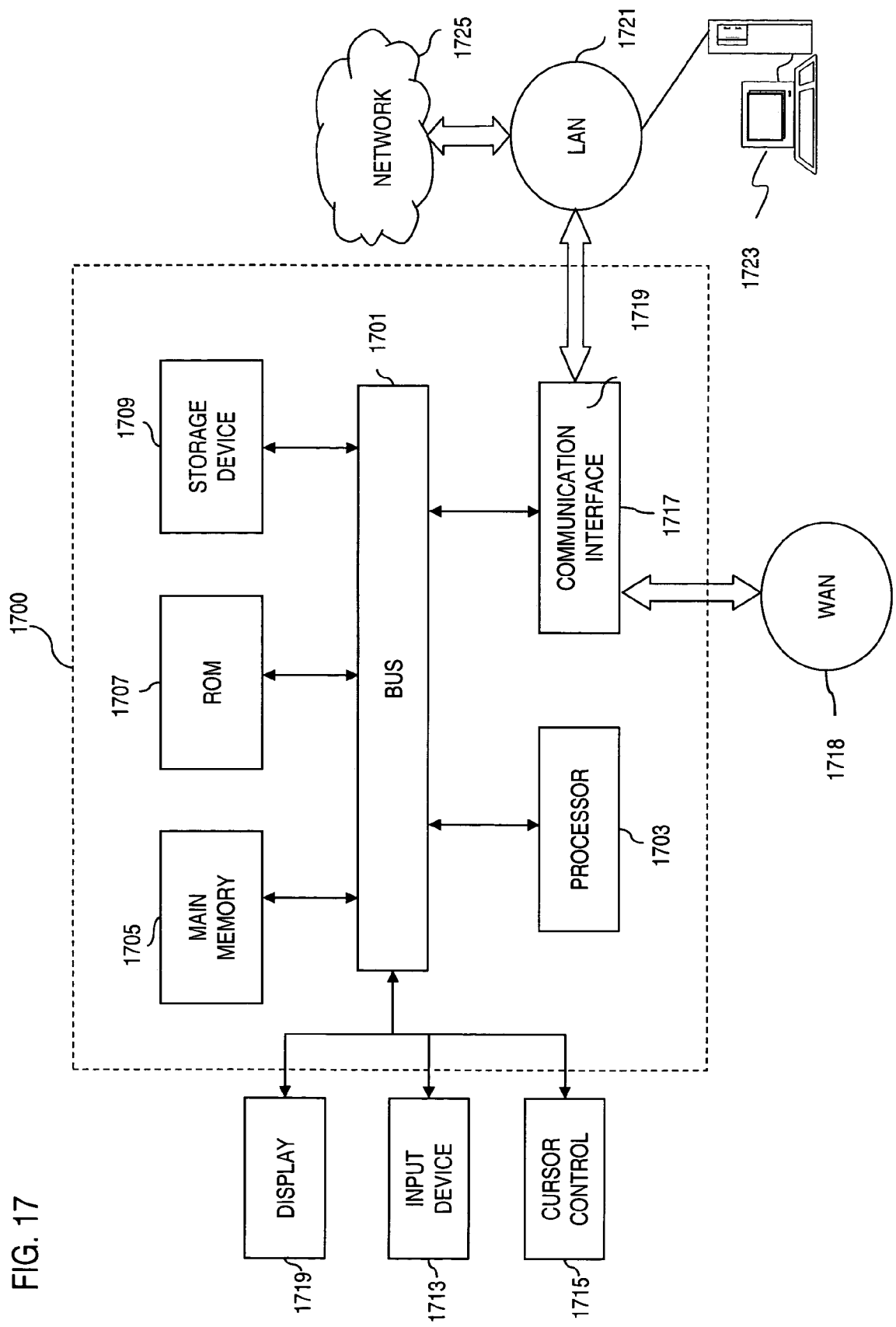
FIG. 17 is a diagram of a computer system that can be used to implement an embodiment of the present invention.

FIG. 17 illustrates a computer system 1700 upon which an embodiment according to the present invention can be implemented. The computer system 1700 includes a bus 1701 or other communication mechanism for communicating information and a processor 1703 coupled to the bus 1701 for processing information. The computer system 1700 also includes main memory 1705, such as a random access memory (RAM) or other dynamic storage device, coupled to the bus 1701 for storing information and instructions to be executed by the processor 1703. Main memory 1705 can also be used for storing temporary variables or other intermediate information during execution of instructions by the processor 1703. The computer system 1700 may further include a read only memory (ROM) 1707 or other static storage device coupled to the bus 1701 for storing static information and instructions for the processor 1703. A storage device 1709, such as a magnetic disk or optical disk, is coupled to the bus 1701 for persistently storing information and instructions.

The computer system 1700 may be coupled via the bus 1701 to a display 1711, such as a cathode ray tube (CRT), liquid crystal display, active matrix display, or plasma display, for displaying information to a computer user. An input device 1713, such as a keyboard including alphanumeric and other keys, is coupled to the bus 1701 for communicating information and command selections to the processor 1703. Another type of user input device is a cursor control 1715, such as a mouse, a trackball, or cursor direction keys, for communicating direction information and command selections to the processor 1703 and for controlling cursor movement on the display 1711.

According to one embodiment of the invention, the processes of FIGS. 16a and 16b are provided by the computer system 1700 in response to the processor 1703 executing an arrangement of instructions contained in main memory 1705. Such instructions can be read into main memory 1705 from another computer-readable medium, such as the storage device 1709. Execution of the arrangement of instructions contained in main memory 1705 causes the processor 1703 to perform the process steps described herein. One or more processors in a multi-processing arrangement may also be employed to execute the instructions contained in main memory 1705. In alternative embodiments, hard-wired circuitry may be used in place of or in combination with software instructions to implement the embodiment of the present invention. Thus, embodiments of the present invention are not limited to any specific combination of hardware circuitry and software.

The computer system 1700 also includes a communication interface 1717 coupled to bus 1701. The communication interface 1717 provides a two-way data communication coupling to a network link 1719 connected to a local network 1721. For example, the communication interface 1717 may be a digital subscriber line (DSL) card or modem, an integrated services digital network (ISDN) card, a cable modem, a telephone modem, or any other communication interface to provide a data communication connection to a corresponding type of communication line. As another example, communication interface 1717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1717 sends and receives electrical, electromagnetic, or optical signals that carry digital data streams representing various types of information. Further, the communication interface 1717 can include peripheral interface devices, such as a Universal Serial Bus (USB) interface, a PCMCIA (Personal Computer Memory Card International Association) interface, etc. Although a single communication interface 1717 is depicted in FIG. 17, multiple communication interfaces can also be employed. For example, the communication interface 1717 can be a card that communicates with a Wide Area Network (WAN) 1718.

The network link 1719 typically provides data communication through one or more networks to other data devices. For example, the network link 1719 may provide a connection through local network 1721 to a host computer 1723, which has connectivity to a network 1725 (e.g. a wide area network (WAN) or the global packet data communication network now commonly referred to as the "Internet") or to data equipment operated by a service provider. The local network 1721 and network 1725 both use electrical, electromagnetic, or optical signals to convey information and instructions. The signals through the various networks and the signals on network link 1719 and through communication interface 1717, which communicate digital data with computer system 1700, are exemplary forms of carrier waves bearing the information and instructions.

The computer system 1700 can send messages and receive data, including program code, through the network(s), network link 1719, and communication interface 1717. In the Internet example, a server (not shown) might transmit requested code belonging an application program for implementing an embodiment of the present invention through the network 1725, local network 1721 and communication interface 1717. The processor 1703 may execute the transmitted code while being received and/or store the code in storage device 179, or other non-volatile storage for later execution. In this manner, computer system 1700 may obtain application code in the form of a carrier wave.

The term "computer-readable medium" as used herein refers to any medium that participates in providing instructions to the processor 1705 for execution. Such a medium may take many forms, including but not limited to non-volatile media, volatile media, and transmission media. Non-volatile media include, for example, optical or magnetic disks, such as storage device 1709. Volatile media include dynamic memory, such as main memory 1705. Transmission media include coaxial cables, copper wire and fiber optics, including the wires that comprise bus 1701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the present invention provides a satellite network that supports communication, in a full mesh configuration, among a central route server and route clients. The route server collects routing information from the route clients, and modifies a database storing a route table of routes reachable over the satellite network based on the routing information. The route server distributes the routes to the route clients via either a multicast or a unicast. This routing architecture advantageously minimizes use of bandwidth in the distribution of routes. Furthermore, the present invention permits each route client to redirect traffic to another route client if the data cannot reach its destination via the particular route client.

While the present invention has been described in connection with a number of embodiments and implementations, the present invention is not so limited but covers various obvious modifications and equivalent arrangements, which fall within the purview of the appended claims.

What is claimed is:

1. A communication apparatus for routing over a radio network, the apparatus comprising:
   an air interface configured to receive a packet over the radio network, the packet being destined for a destination host, wherein the radio network supports meshed connectivity;
   a communication interface coupled to the air interface; and
   logic for determining whether the destination host is reachable by the communication interface based upon a route table,
   wherein if the destination host is determined not to be reachable, the logic redirects the packet over the radio network according to the route table,
   wherein a route sewer within the radio network is configured to collect routing information from a plurality of terminals including the source terminal, the routing information specifying reachability of a host or a network connected to a corresponding one of the terminals, the route table being updated based on the collected routing information.

2. An apparatus according to claim 1, wherein the radio network is a satellite network.

3. An apparatus according to claim 1, wherein the logic operates according to a prescribed protocol for providing on-demand dynamic routing of the packet over the radio network.

4. An apparatus according to claim 1, wherein the air interface receives a message from a route sewer for updating of the route table.

5. An apparatus according to claim 4, wherein the message includes:
   a field for specifying a version of the prescribed protocol;
   a field for specifying an entry to the route table; and
   a field for specifying version of the entry of the route table.

6. An apparatus according to claim 4, wherein the message is multicast from the route server.

7. An apparatus according to claim 1, wherein the route server performs routing metric computations for the terminals based on the collected routing information.

8. An apparatus according to claim 1, wherein the route server applies network wide routing policies based on the collected routing information to update the route table.

9. A communication apparatus for routing over a radio network, the apparatus comprising:
   a first interface means for receiving a packet over the radio network, the packet being destined for a destination host, wherein the radio network supports meshed connectivity;
   a second interface means coupled to the first interface means;
   means for determining whether the destination host is reachable by the second interface means based upon a route table; and
   means for redirecting the packet over the radio network according to the route table if the destination host is determined not to be reachable,
   wherein a route server within the radio network is configured to collect routing information from a plurality of terminals including the source terminal, the routing information specifying reachability of a host or a network connected to a corresponding one of the terminals, the route table being updated based on the collected routing information.

10. An apparatus according to claim 9, wherein the radio network is a satellite network.

11. An apparatus according to claim 9, wherein the redirecting means operates according to a prescribed protocol for providing on-demand dynamic routing of the packet over the radio network.

12. An apparatus according to claim 9, wherein the first interface means receives a message from a route server for updating of the route table.

13. An apparatus according to claim 12, wherein the message includes:
   a field for specifying a version of the prescribed protocol;
   a field for specifying an entry to the route table; and
   a field for specifying version of the entry of the route table.

14. An apparatus according to claim 12, wherein the message is multicast from the route server.

15. An apparatus according to claim 9, wherein the route server performs routing metric computations for the terminals based on the collected routing information.

16. An apparatus according to claim 9, wherein the route server applies network wide routing policies based on the collected routing information to update the route table.

17. A method for routing over a radio network, the method comprising:

receiving a packet over the radio network, the packet being destined for a destination host, wherein the radio network supports meshed connectivity;

determining whether the destination host is reachable by a communication interface based upon a route table; and selectively redirecting the packet over the radio network according to the route table, wherein a route server within the radio network is configured to collect routing information from a plurality of terminals including the source terminal, the routing information specifying reachability of a host or a network connected to a corresponding one of the terminals, the route table being updated based on the collected routing information.

18. A method according to claim 17, wherein the radio network in the receiving step is a satellite network.

19. A method according to claim 17, wherein the packet is redirected according to a prescribed protocol for providing on-demand dynamic routing of the packet over the radio network.

20. A method according to claim 17, further comprising: receiving a message from a route server for updating of the route table.

21. A method according to claim 20, wherein the message includes:
a field for specifying a version of the prescribed protocol;
a field for specifying an entry to the route table; and
a field for specifying version of the entry of the route table.

22. A method according to claim 20, wherein the message is multicast from the route server.

23. A method according to claim 17, wherein the route server performs routing metric computations for the terminals based on the collected routing information.

24. A method according to claim 17, wherein the route server applies network wide routing policies based on the collected routing information to update the route table.

25. A computer-readable medium bearing instructions for routing, said instruction, being arranged, upon execution, to cause one or more processors to perform the method of claim 17.

26. A method of supporting intra-domain routing, the method comprising:
receiving, at a route server, routing information from one of a plurality of route clients, the route clients being in communication with the route server over a first data network that is fully meshed,
wherein the routing information specifies reachability of a host that is within a second data network served by the one route client;
modifying a route table of the route server in response to the received routing information;
transmitting a message based on the modified route table to the route clients for updating of respective route tables of the route clients;
receiving a heartbeat message from the one route client; and
in response to the received heartbeat message, transmitting a rejoin message to the one route client to initiate transmission of the routing information.

27. A method according to claim 26, wherein the first data network in the receiving step is a satellite network, and the second data network is a terrestrial network.

28. A method according to claim 27, further comprising: maintaining a list of the route clients that are inactive, wherein said clients, in an inactive state, do not provide routing information to the route server.

29. A method according to claim 26, wherein the message is partitioned into a plurality of packets for transmission to the route clients, each of the packets having a sequence number for the route clients to assemble the transmitted message.

30. A method according to claim 26, further comprising:
determining the number of the route clients that are to receive the message; and
comparing the number with a threshold, wherein the message is selectively transmitted as a multicast to the route clients based on the comparison.

31. A method according to claim 26, wherein each one of the route clients in the receiving step is configured to redirect a packet received from another one of the route clients.

32. A computer-readable medium bearing instructions for routing, said instruction, being arranged, upon execution, to cause one or more processors to perform the method of claim 26.

33. A method of supporting intra-domain routing over a satellite network, the method comprising:
determining routes reachable over a terrestrial interface;
transmitting routing information associated with the reachable routes over a satellite interface communicating with the satellite network to a route server, wherein the route server modifies a database storing routes reachable over the satellite network based on the routing information, the satellite network being fully meshed; and
selectively receiving routes reachable via the satellite interface from the route server, wherein the route server is configured to determine whether the routes reachable via the satellite interface is to be transmitted as a multicast or a unicast based a threshold relating to a number of the route clients that are to receive the routes reachable via the satellite interface.

34. A method according to claim 33, further comprising:
executing a first routing protocol associated with the terrestrial interface; and
executing a second routing protocol associated with the satellite interface.

35. A method according to claim 33, wherein the routes in the receiving step is transmitted by the route server as a plurality of messages, the method further comprising:
buffering the plurality of messages according to sequence numbers corresponding to the respective messages.

36. A method according to claim 33, further comprising:
transmitting a heartbeat message to the route server; and
receiving a rejoin message, in response to the transmitted heartbeat message, to initiate transmission of updates to the routes reachable over the terrestrial interface.

37. A method according to claim 33, further comprising:
receiving data at the satellite interface from a first route client;
determining that the data cannot be routed over the terrestrial interface based on the stored routes; and
transmitting the data out of the satellite interface to a second route client.

38. A computer-readable medium bearing instructions for routing, said instruction, being arranged, upon execution, to cause one or more processors to perform the method of claim 33.

39. A server apparatus for supporting intra-domain routing, the apparatus comprising:

an air interface configured to communicate with a radio network supporting communication among a plurality of terminals according to a meshed topology, each of the terminals being configured as a route client, the air interface receiving routing information from one of the terminals, wherein the routing information specifies reachability of a host that is within a data network served by the one terminal; and memory configured to store a route table that is modified based on the received routing information, wherein a message is transmitted via the air interface to the terminals based on the modified route table for updating of respective route tables of the terminals, wherein a heartbeat message is received via the air interface from the one route client, and in response to the received heartbeat message, a rejoin message is transmitted to the one route client to initiate transmission of the routing information.

40. An apparatus according to claim 39, wherein the radio network is a satellite network.

41. An apparatus according to claim 40, further comprising:
a processor configured to generate a list of the terminals that are inactive, wherein said clients, in an inactive state, do not provide routing information to the route server.

42. An apparatus according to claim 39, wherein the message is partitioned into a plurality of packets for transmission to the terminals, and each of the packets having a sequence number, the sequence numbers being employed by the routes to assemble the transmitted message.

43. An apparatus according to claim 39, further comprising:
a processor configured to determine the number of the terminals that are to receive the message, and to compare the number with a threshold, wherein the message is selectively transmitted as a multicast to the terminals based on the comparison.

44. A terminal apparatus for supporting intra-domain routing over a satellite network, the apparatus comprising:
a terrestrial interface configured to communicate with a plurality of network elements;
a processor configured to determine routes reachable to the plurality of network elements; and
a satellite interface configured to transmit routing information associated with the reachable routes to a route server within the satellite network having a meshed configuration,
wherein the route server modifies a database storing routes reachable over the satellite network based on the routing information, and routes reachable via the satellite interface are selectively received from the route server,
wherein the satellite interface transmits a heartbeat message to the route server, the satellite interface receiving a rejoin message, in response to the transmitted heartbeat message, to initiate transmission of updates to the routes reachable over the terrestrial interface.

45. An apparatus according to claim 44, wherein the processor is further configured to execute a first routing protocol associated with the terrestrial interface, and a second routing protocol associated with the satellite interface.

46. An apparatus according to claim 44, wherein the routes is transmitted by the route server as a plurality of messages, the apparatus further comprising:
memory configured to buffer the plurality of messages according to sequence numbers corresponding to the respective messages.

47. An apparatus according to claim 44, wherein the route server is configured to determine whether the routes are to be transmitted as a multicast or a unicast based a threshold relating to a number of route clients that is to receive the routes.

* * * * *